(12) United States Patent
Sher

(10) Patent No.: US 10,696,374 B2
(45) Date of Patent: Jun. 30, 2020

(54) COMPOSITE MATERIAL AND AIRCRAFT IMPROVEMENTS

(71) Applicant: Yevgeniy Il'ich Sher, San Bruno, CA (US)

(72) Inventor: Yevgeniy Il'ich Sher, San Bruno, CA (US)

( * ) Notice: Subject to any disclaimer, the term of this patent is extended or adjusted under 35 U.S.C. 154(b) by 230 days.

(21) Appl. No.: 15/819,685

(22) Filed: Nov. 21, 2017

(65) Prior Publication Data

US 2018/0141659 A1    May 24, 2018

Related U.S. Application Data

(60) Provisional application No. 62/424,997, filed on Nov. 21, 2016.

(51) Int. Cl.
| | |
|---|---|
| *B64C 3/26* | (2006.01) |
| *B64C 39/02* | (2006.01) |
| *B64D 47/08* | (2006.01) |
| *B64C 1/26* | (2006.01) |
| *B64C 1/16* | (2006.01) |
| *B64C 3/18* | (2006.01) |
| *B64C 1/00* | (2006.01) |

(52) U.S. Cl.
CPC ............... *B64C 3/26* (2013.01); *B64C 1/16* (2013.01); *B64C 1/26* (2013.01); *B64C 3/18* (2013.01); *B64C 39/024* (2013.01); *B64D 47/08* (2013.01); *B64C 2001/0072* (2013.01); *B64C 2201/021* (2013.01); *B64C 2201/127* (2013.01); *B64C 2211/00* (2013.01)

(58) Field of Classification Search
CPC .... B64C 1/16; B64C 1/26; B64C 3/26; B64C 2211/00; A63H 27/001; A63H 27/06
See application file for complete search history.

(56) References Cited

U.S. PATENT DOCUMENTS

| | | | | |
|---|---|---|---|---|
| 1,352,343 | A * | 9/1920 | Baker | A63H 27/001 446/59 |
| 1,568,319 | A * | 1/1926 | Cogswell | A63H 27/00 446/61 |

(Continued)

FOREIGN PATENT DOCUMENTS

| | | | | |
|---|---|---|---|---|
| DE | 1603389 A1 * | 7/1970 | | A63H 27/001 |
| FR | 410079 A * | 5/1910 | | A63H 27/001 |

(Continued)

*Primary Examiner* — Magdalena Topolski
(74) *Attorney, Agent, or Firm* — Maschoff Brennan

(57) ABSTRACT

A rail-based modular aircraft system may include a rail extending from a first end to a second end. The rail-based modular aircraft system may include a constant cross-sectional shape from the first end to the second end. The rail may also include a wing module configured to interface with the rail such that the wing module is individually movable along at least a portion of the rail and configured to be fixable at a fixed point along the rail. The rail-based modular aircraft system may also include a propulsion module configured to interface with the rail such that the propulsion module is individually movable along at least a portion of the rail and configured to be fixable at a fixed point along the rail. The propulsion module may be configured to provide forward motion to the modular aircraft system.

8 Claims, 18 Drawing Sheets

(56) References Cited

U.S. PATENT DOCUMENTS

| | | | | |
|---|---|---|---|---|
| 2,306,866 | A | * | 12/1942 | Crary .................. A63H 27/001 446/62 |
| 3,004,645 | A | * | 10/1961 | Moul, Jr. .................. B64C 1/26 244/131 |
| 3,640,491 | A | * | 2/1972 | Harrison .................. B64C 1/00 244/117 R |
| 4,828,202 | A | * | 5/1989 | Jacobs ...................... B64C 1/06 118/268 |
| 8,602,351 | B2 | * | 12/2013 | Dennison .................. B64C 1/26 244/131 |
| 2005/0191930 | A1 | * | 9/2005 | Foster .................. A63H 27/001 446/57 |
| 2007/0056246 | A1 | * | 3/2007 | Escobar Benavides ..................... B29D 99/0007 52/837 |
| 2014/0312169 | A1 | * | 10/2014 | Fisher .................. B64C 39/024 244/89 |
| 2015/0203200 | A1 | * | 7/2015 | Bye ...................... B64C 39/024 244/13 |
| 2017/0113778 | A1 | * | 4/2017 | Liu ...................... B64C 39/024 |
| 2018/0354603 | A1 | * | 12/2018 | Elson .................. B64C 3/26 |
| 2019/0144007 | A1 | * | 5/2019 | Lum ...................... B61B 1/005 105/150 |
| 2019/0256189 | A1 | * | 8/2019 | Fenske .................. B64C 3/187 |

FOREIGN PATENT DOCUMENTS

| | | | | | |
|---|---|---|---|---|---|
| FR | | 424224 | A * | 5/1911 | ........... A63H 27/001 |
| FR | | 532739 | A * | 2/1922 | ............... B64C 3/26 |
| WO | WO-2005098241 | A1 * | 10/2005 | ........... B23K 33/004 |
| WO | WO-2010109370 | A1 * | 9/2010 | ............. A63H 33/16 |

* cited by examiner

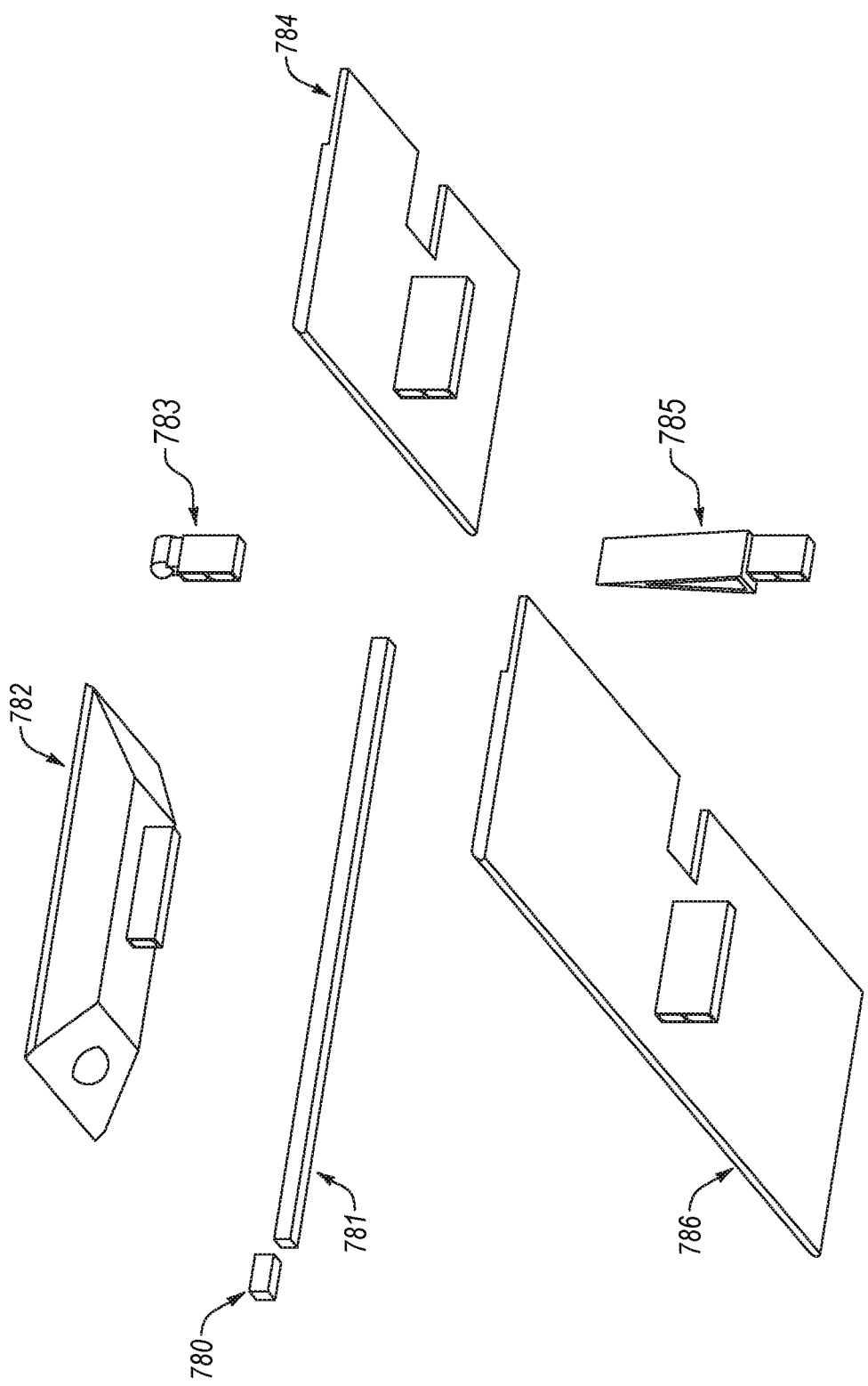

COMPOSITE MATERIAL AND AIRCRAFT IMPROVEMENTS

CROSS-REFERENCE TO RELATED APPLICATIONS

This application claims priority to U.S. Provisional Application No. 62/424,997, filed Nov. 21, 2016, titled "COMPOSITE MATERIAL AND AIRCRAFT IMPROVEMENTS," which is incorporated herein by reference in its entirety.

FIELD

The present disclosure may relate to a composite material and aircraft improvements.

BACKGROUND

With increased use of manned and autonomous aircraft, it can be difficult to find lightweight, strong materials to construct the aircraft. Additionally, once constructed, it can be difficult to adapt aircraft to new purposes, tasks, or goals.

The subject matter claimed herein is not limited to embodiments that solve any disadvantages or that operate only in environments such as those described above. Rather, this background is only provided to illustrate one example technology area where some embodiments described herein may be practiced.

SUMMARY

A rail-based modular aircraft system may include a rail extending from a first end to a second end. The rail-based modular aircraft system may include a constant cross-sectional shape from the first end to the second end. The rail may also include a wing module configured to interface with the rail such that the wing module is individually movable along at least a portion of the rail and configured to be fixable at a fixed point along the rail. The rail-based modular aircraft system may also include a propulsion module configured to interface with the rail such that the propulsion module is individually movable along at least a portion of the rail and configured to be fixable at a fixed point along the rail. The propulsion module may be configured to provide forward motion to the modular aircraft system.

A modular aircraft system may include a triangular wing member with a covering of a first composite material. The first composite material may include a first corrugated holding material and multiple first strengthening material components. The first corrugated holding material may include a base edge, a first surface, a second surface opposite the first surface, a first leading edge, a second leading edge, and multiple first corrugations extending along a first axis of the first corrugated holding material. The first leading edge may taper inwards as the first leading edge extends away from the base edge. The second leading edge may be opposite the first leading edge and may taper inwards as the second leading edge extends away from the base edge. The first axis may be substantially parallel to the base edge and the multiple first strengthening material components. The first composite material may be rigid along the first axis and may be bendable along a second axis substantially perpendicular to the first axis. The modular aircraft system may also include multiple modules configured to interface with the wing member such that the multiple modules are removably attached to the wing member.

A composite material may include a corrugated holding material with multiple corrugations extending along a first axis of the corrugated holding material. The composite material may also include multiple strengthening material components disposed within the multiple corrugations such that the composite material is stiff along the first axis and is bendable along a second axis of the corrugated holding material substantially perpendicular to the first axis.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF DRAWINGS

Example embodiments will be described and explained with additional specificity and detail through the use of the accompanying drawings in which:

FIG. 7G illustrates a fourth example rail-based modular aircraft system using the rail and the group of modules;

DESCRIPTION OF EMBODIMENTS

Composite Material (Sher Composite Wrap)

One or more embodiments of the present disclosure may include a composite material made from two separate mechanical components physically joined together to form the composite material. The composite material may include properties of being highly rigid in one dimension, while pliable in a perpendicular dimension. The composite material may include a holding material configured to receive a second strengthening component.

Figure 1:
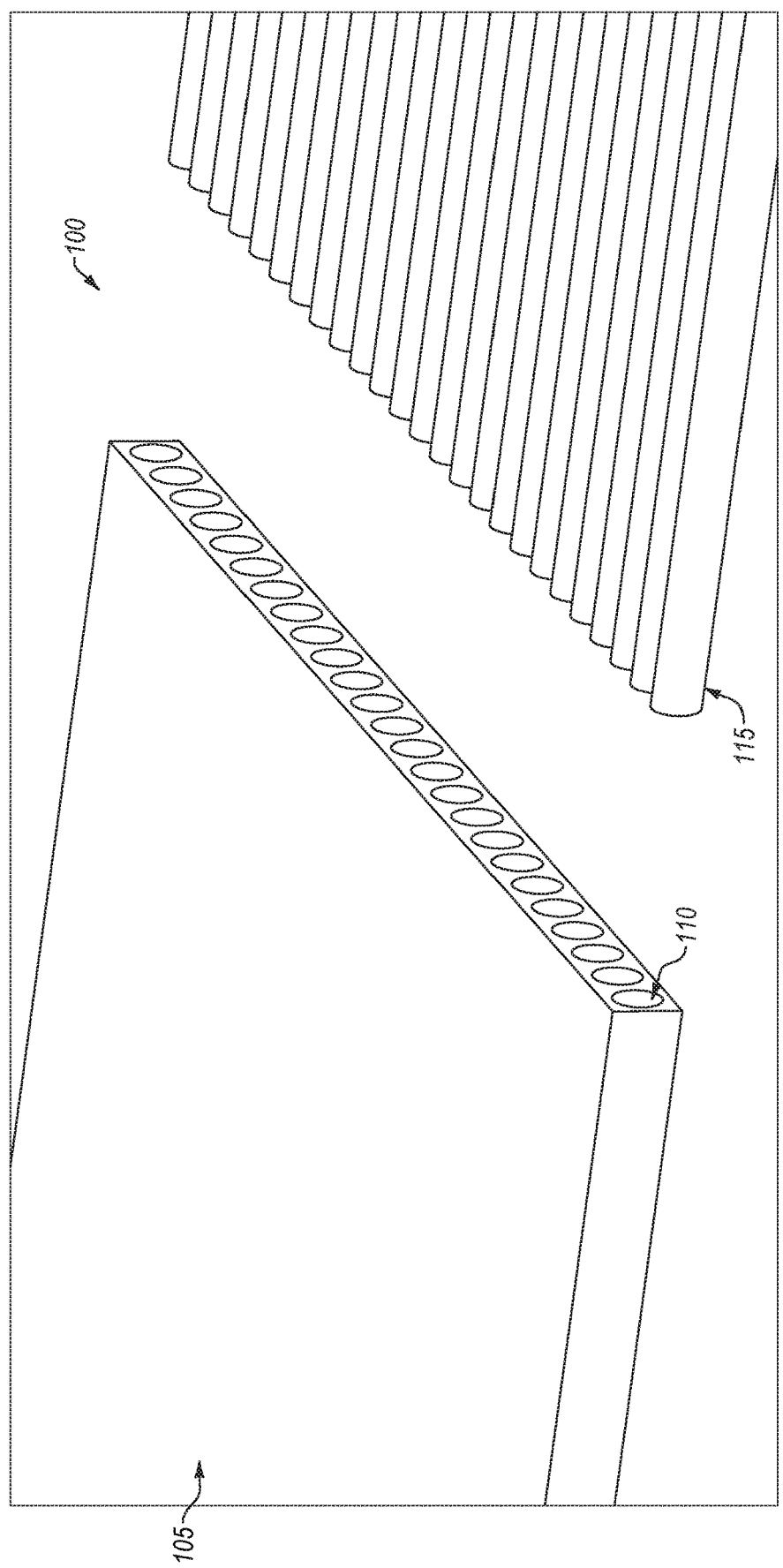
FIG. 1 illustrates an example of components of a composite material.

FIG. 1 illustrates an example of components of a composite material 100. As illustrated in FIG. 1, the composite material 100 may include a holding material 105 and multiple strengthening material components 115.

In some embodiments, the holding material 110 may include a corrugated pliable material with corrugations 110 or other gaps/holes (for example, corrugated plastic/coroplast) for receiving the strengthening material components 115. The strengthening material components 115 may include a rigid material that, when inserted into the holding material 105, provides rigidity in one direction while allowing the holding material 105 flexibility in another direction. For example, the strengthening material components 115 may include carbon fiber rods or tubes, wooden rods or tubes, aluminum or other metal rods or tubes, etc. The strengthening material components 115 may be shaped and/or dimensioned such that the strengthening material components 115 can be inserted into the corrugations 110. In some embodiments, the strengthening material components 115 may have a generally cylindrical shape. However, rather than a circular or curved cross section, the strengthening material components 115 may have a square or rectangular shape (e.g., such as a beam), a hexagonal shape, or any other shape. Typically, the strengthening material components 115 will be more than ten times longer than the cross-sectional diameter of the strengthening material components 115. As described in the present disclosure, the length and/or the cross-sectional diameter of the strengthening material components 115 may be determined based on one or more of the size of the structure that may be built using the composite material 100, the application for which the structure is to be used, the size of the corrugations 110 within the holding material 105, cost constraints, etc.

In some embodiments, the holding material 105 may include a corrugated sheet made out of soft or semi-soft material (such as polypropylene, the material for several standard corrugated plastics, or a more specialized material made for the particular industrial application). For example, the size, dimension, regularity, etc. of the corrugations 110 or holes may be based on the application. In these and other embodiments, the corrugations 110 may be generally parallel along one direction or axis of the holding material 105, and may pass through the entire or substantially the entire holding material 105 in the one direction. In some embodiments, the holding material 105 may be a durable woven material, formed to include corrugations 110 or slots for the strengthening material components 115. The holding material 105 may also be made of any of a variety of polymers, such as acrylic, poly(vinyl chloride) (PVC), polythene, polyethylene, etc.

In some embodiments, by inserting the strengthening material components 115 into the corrugations 110, the strengthening material components 115 may provide stiffness along the dimension of the strengthening material components 115 while allowing the pliable holding material 105 to move in a direction perpendicular to the length of the strengthening material components 115. The composite material 100 results in a sheet of material that is stiff or rigid in one axis (the direction of the length of the strengthening material components 115), yet able to bend and thus wrap along the perpendicular axis (the direction perpendicular to the length of the strengthening material components 115). Due to the properties of the composite material 100, the composite material 100 may be used to construct three dimensional objects, such as wings, by wrapping the composite material 100 around strategically shaped frame members, to produce structures which are stiff in the dimension of the strengthening material components 115.

The composite material 100 may be used for structures which can be produced through a wrapping method, for example, by wrapping around a shaping structure or frame. For example airfoil shaped "ribs" may be used as a structure around which the composite material 100 (the Sher Composite Wrap) may be wrapped.

Figure 2:
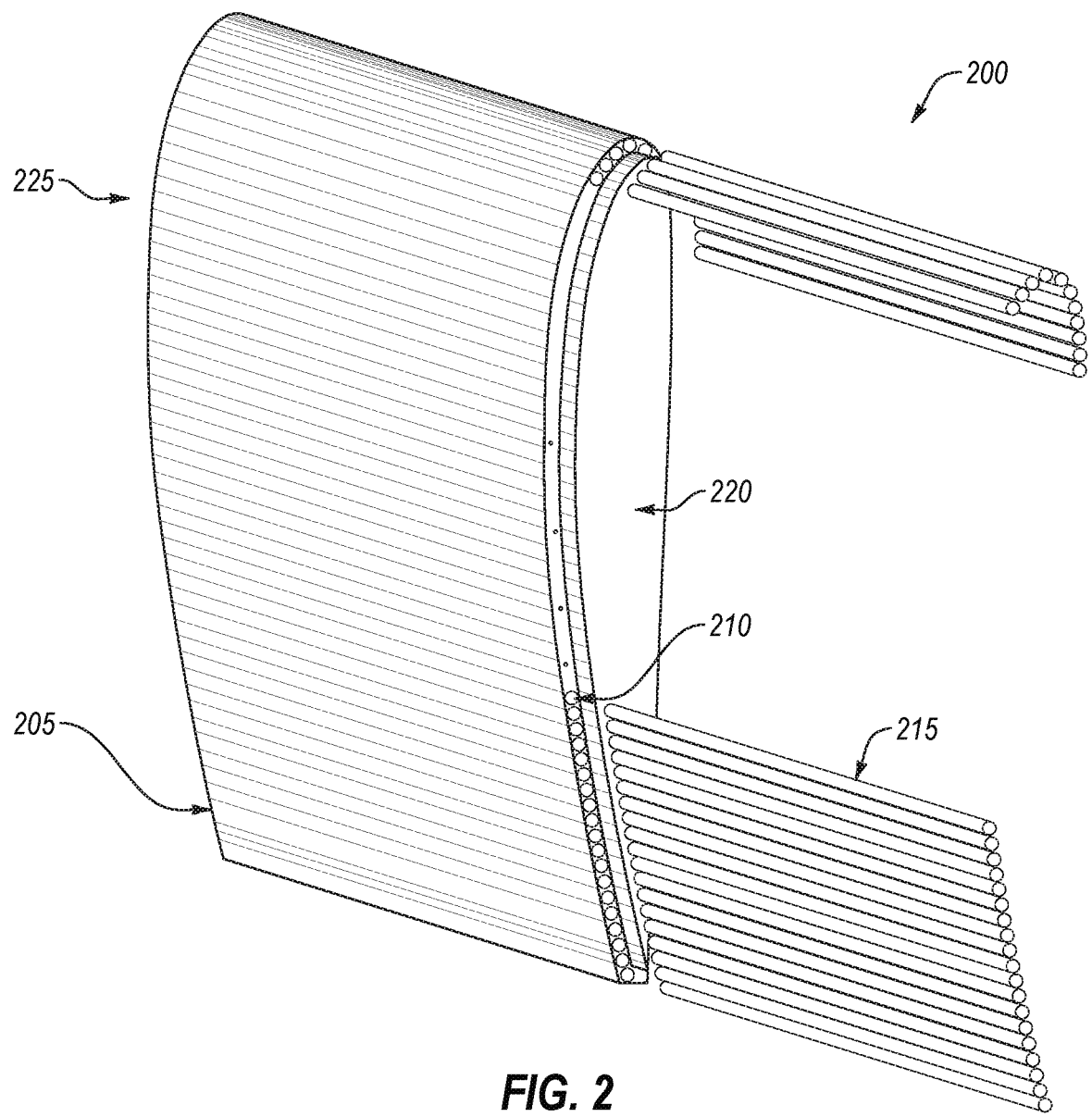
FIG. 2 illustrates an example of a wing formed using the composite material of FIG. 1.

FIG. 2 illustrates an example of a wing 200 formed using the composite material 225. The composite material 225 may be similar to the composite material 100 of FIG. 1 and may include a holding material 205, multiple corrugations 210, and multiple strengthening materials 215. For example, FIG. 2 illustrates a frame 220 around which the composite material 225 may be wrapped, referred to as an "airfoil shaper." The frame 220 may be created using 3D printing techniques or any other manufacturing process. In some embodiments, the frame 220 may be manufactured to be hollow to save on weight. In some embodiments, the frame 220 may include members such as cross bars or shapes which may be distributed in such a way that the composite material 225 can then be wrapped around the frame 220, to take on the shape of the frame 220 (e.g., the Airfoil Shaper of FIG. 2), thus producing a particular shape (e.g., a true airfoil based wing, as illustrated in FIG. 2).

In some cases, some wings built for industrial grade scale aircraft (ranging from unmanned aerial vehicles (UAVs) to standard sized aircraft) are constructed either using aircraft grade aluminum or other type of aircraft grade metal ribs, covered by thin metal sheets forming the skin. Some methods include shaping wings out of carbon fiber by layering thin sheets into the needed shape, and then using resin for bonding purposes and then fixing the shape. Both of these methods are extremely time consuming and costly. On the other side of the size spectrum are small remote control (RC) aircraft, such those as used in hobby applications. In hobby grade aircraft, wings made to possess true airfoils are created and shaped out of foam. Foam-based wings are fragile, and cannot scale in size and durability to industrial grade aircraft.

Constructing a wing of an aircraft using one or more approaches consistent with the present disclosure may result in the construction of a wing in a much more rapid manner than using traditional methods. Additionally, the properties of the wing may be controlled via the selection of various aspects of the composite material 225. For example, the rigidity of the composite material 225 may be controlled by the type of material used to produce the holding material 205 (e.g., a corrugated sheet) and the number and type of strengthening materials 215 (e.g., carbon fiber inserts) used. The larger the number of strengthening material 215 components used, the greater the rigidity along the dimension parallel to the length of the strengthening material 215, while allowing the composite material 225 to retain its ability to wrap around frames 220.

In some embodiments, the composite material 225 may include a variety of advantages, including that the composite material 225 is light weight, yet stiff in the dimension needed to produce a desired three-dimensional structure/shape, by wrapping around a frame 220. Additionally or alternatively, the composite material 225 may be modified based on the type of strengthening materials 215, the shape of the strengthening materials 215, and the material used to create the holding material 205 (e.g., whether single or multi-walled and the depth of the walls). Additionally or alternatively, the composite material 225 may have a controllable rigidity. For example, the rigidity may be controlled by the material used to produce the holding material 205, and the number of strengthening material 215 components used within the holding material 205. For example, a corrugated material may be completely filled in by carbon fiber rods, thus producing a type of carbon fiber sheet composite which is extremely rigid (nearly all carbon fiber) in one dimension, yet can be used to wrap along its other dimension, to take on the form of an airfoil (e.g., as illustrated in FIG. 2). Such a curved carbon fiber structure may be produced without the use of resin and thus can greatly speed up the production and construction of certain structures.

In some embodiments, a wing 200 may be constructed using a composite material 225 in accordance with the present disclosure, such as a single directional corrugated material reinforced with carbon fiber rods/tubes inserted into the corrugations. The composite material 225 may be wrapped around one or more frames 220 (e.g., airfoil shapers, such as illustrated in FIG. 2).

In some embodiments the size and/or dimensions of a wing 200 may be scaled by adjusting various parameters of the composite material 225. For example, the thickness or wall thickness of the holding material 205 may be increased for larger wings 200. Additionally or alternatively, the diameter or material selection of the strengthening material 215 may be increased or changed to increase the rigidity of the strengthening materials 215. Such modifications may yield a stronger composite material 225 that may allow for the construction of larger wings 200. For example, in some embodiments, wings 200 constructed in a manner consistent with the present disclosure may be sized for a hobby application, such as less than one meter across. By varying various properties of the composite material 225, wings 200 may be constructed five meters across, ten meters across, and even larger.

In some embodiments, a wing 200 with a taper going from a fuselage of an aircraft to the tip of the wing 200 may be manufactured by adjusting the shape of the frame 220. In these and other embodiments, the wrapping of the composite material 225 may take on a shape similar to a frusto-conical shape with the base proximate the fuselage of the aircraft and the truncated apex proximate the tip of the wing 200. Other variations in shape or curvature may also be accomplished by varying the shape and/or dimensions of the frame 220 about which the composite material 225 may be wrapped.

Figure 3:
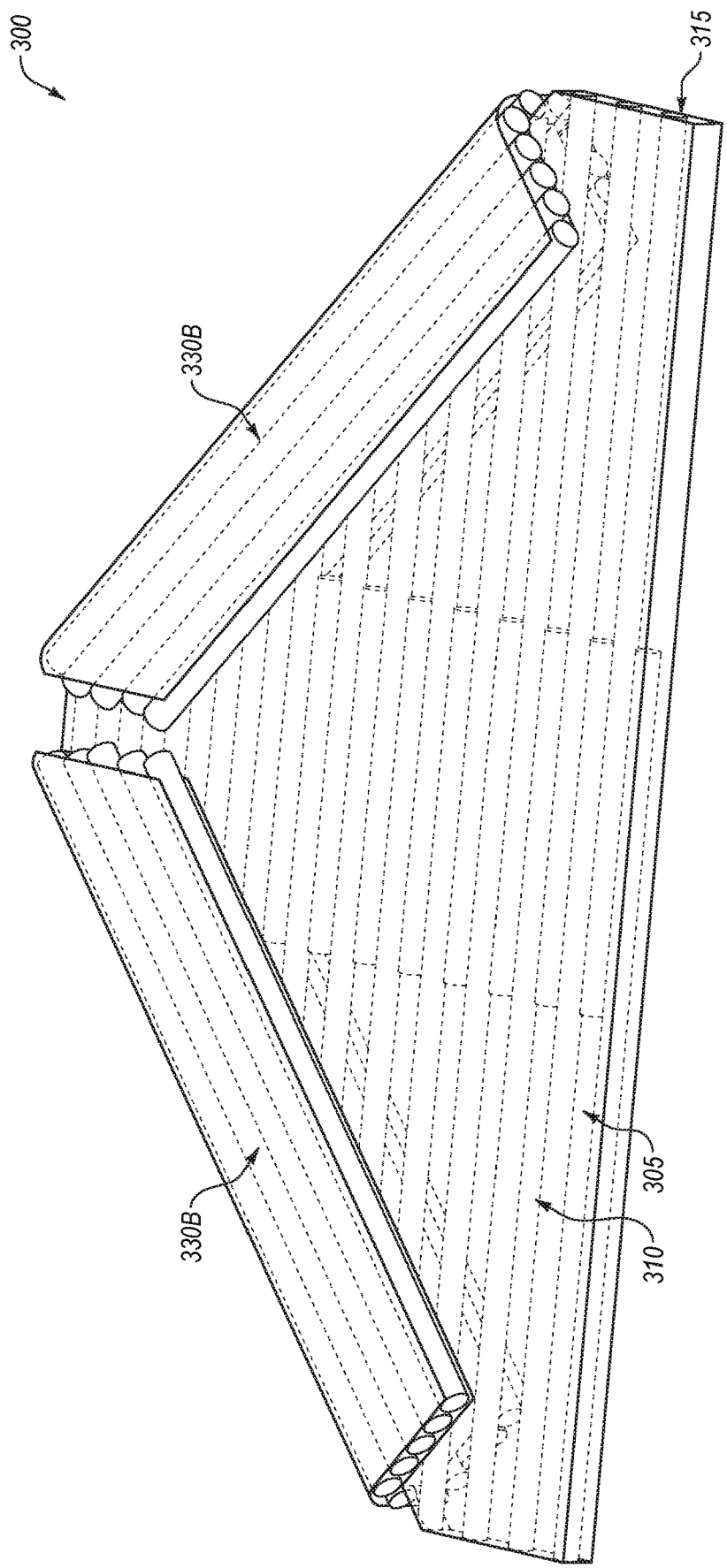
FIG. 3 illustrates another example of a wing formed using a composite material.

FIG. 3 illustrates another example embodiment of a wing 300 formed using a composite material in accordance with one or more embodiments of the present disclosure. In some embodiments, such as illustrated in FIG. 3, the wing 300 may take a Kline-Fogleman shape. Such a shape may be used in any of a variety of contexts, including for smaller wings such as for the hobby industry.

As illustrated in FIG. 3, a core portion 305 of the composite material may be shaped in a desired wing profile, such as a triangular shape. In some embodiments, a triangular shape may include a generally triangular shape with one or more variations. For example, a pentagon with two short sides such that the general shape and/or appearance of the pentagon is triangular may be considered a generally triangular shape. As an additional example, a hexagon with three short sides, each short side between two longer sides such that the general shape and/or appearance of the pentagon is triangular may be considered a generally triangular shape. In some embodiments, the core portion 305 may include a frame that is 3D printed to be rigid when flat. In some embodiments, a first additional composite material 330A and a second additional composite material 330B may each be wrapped around leading edges of the triangular shape of the core portion 305. The wrapping of the composite material may create a lip or other cusp at the leading edge of the wing 300 to create lift as air runs over the wing 300. In some embodiments, the additional composite materials 330 may be coupled to the triangular member 305 with an adhesive, screws, bolts, rivets, or any other coupling mechanism.

While illustrated as a triangular shape, any shape is also usable in accordance with the present disclosure for the core portion 305. For example, a flat, rectangular wing may include a wrapped composite material around the leading edge for a Kline-Fogleman arrangement. As another example, a tapered wing or a curved-profile wing may include a wrapped composite material around the leading edge. In some embodiments, multiple layers of wrapped material may be used such that multiple steps may be used in the Kline-Fogleman arrangement.

In some embodiments, a wing 300 may be constructed with a single sheet of holding material running the entire length of the wing 300. For example, the base member 305 may include a single sheet of holding material 310. In these and other embodiments, multiple strengthening material components 315 may span the length of the wing 300. For example, for a ten meter wing, a ten meter sheet of corrugated material may be used with multiple two to four meter length carbon fiber rods disposed in each corrugation. In these and other embodiments, breaks between the strengthening material components may be at different places across various corrugations of the holding material. In some embodiments, some but not all of the corrugations may have breaks between the strengthening material components of the wing. For example, a first corrugation may have a junction at 1.5 meters, while the next corrugation may have a junction at 3 meters, and the next corrugation may have a junction at 4 meters, etc.

Figure 4:
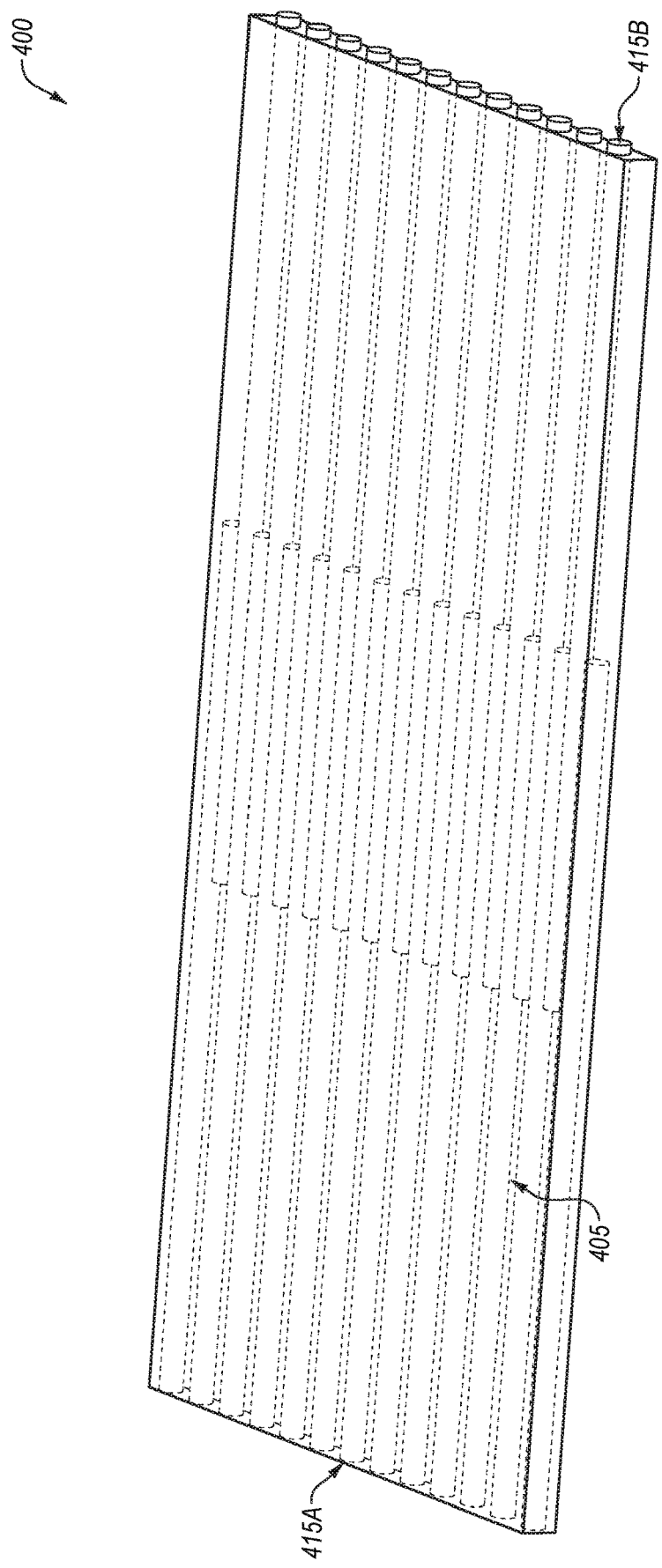
FIG. 4 illustrates another example of a composite material.

FIG. 4 illustrates an example of a composite material 400 including interleaving of strengthening material components 415A and 415B within a holding material 405. For example, as illustrated in FIG. 4, the strengthening material components 415A and 415B may overlap one another and may be positioned such that a break between one strengthening material component 415A and the next strengthening material component 415B may be different for adjacent rows of strengthening material components. Such an arrangement may provide increased rigidity and strength at junctures between lengths of strengthening material components, allowing shorter spans of strengthening material components to be used. While FIG. 4 illustrates a gap between strengthening material components (e.g., the strengthening material components 415A do not continue across the entire holding material 405 and the strengthening material components 415B do not continue across the entire holding material 405), it will be appreciated that in some embodiments, additional strengthening material components 415A and/or 415B may be included in the illustrated gaps.

For example, the interleaving pattern of the strengthening material components 415A and 415B may be arranged such that two adjacent strengthening material components 415A and 415B overlap through a first portion of the holding material 405 (e.g., the middle of the holding material 405 as depicted in FIG. 4) and extend without overlapping through second and third portions of the holding material 405 (e.g., the left side and the right side of the holding material 405 as depicted in FIG. 4).

In some embodiments, a wing may be constructed with multiple sheets of holding material 405. In these and other embodiments, strengthening materials 415A and/or 415B may span from one sheet of holding material 405 to another sheet of holding material 405 in one or more of the corrugations. Additionally or alternatively, the sheets may be adhered together.

In some embodiments a wing may include a cap member at one or both ends of the wings. In some embodiments, such a cap member may be shaped to interface with the fuselage of the aircraft. The caps may be attached by screws or some mechanical fastener, an adhesive, or any other known coupling mechanism as known in the art.

While described in terms of a wing, it will be appreciated that the same frame and wrapping technique using the composite material may be used to construct any of a variety of structures for a variety of purposes. Furthermore, the scaling and properties of the composite material may be selected based on the application.

In some embodiments, one or more of the advantages associated with the present disclosure may include ease of manufacturing a composite material and/or a structure utilizing the composite material. For example, such a composite material may be fairly simple and inexpensive to manufacture. Due to being created by wrapping the composite material around a frame, the process of producing any shape, such as wings, of any size may be rapid, requiring only the producing of frames, and then wrapping the composite material around the structures for the final result. Additionally or alternatively, embodiments of the present disclosure may be scalable. For example, the composite material may be easily scaled for wings of one meter (e.g., by using a corrugated plastic approximately 4 mm in width as the holding material and carbon fibers of length approximately 2 meters as the strengthening material), to wings spanning multiple meters, by using larger corrugated material, with larger carbon fiber rod/tube inserts (for example, 10 mm or 20 mm tubes, which can easily support wings spanning 10 meters and above). Additionally or alternatively, materials constructed in accordance with the present disclosure may be relatively light in weight. For example, the composite material may be a light material and a component such as a wing constructed using manufacturing processes consistent with the present disclosure may be empty inside except for the frame (e.g., airfoil shapers) within. The internal frame may be 3D printed, or produced using any type of light weight material. Such a construction process may result in a very light component (e.g., wing), comparable in strength to those produced using much more expensive forms of manufacturing using purely carbon fiber or aircraft grade aluminum.

Modular Aircraft Systems

One or more embodiments of the present disclosure may include a modular airframe where the sub-components of the airframe, herein referred to as modules, can be attached and detached from a rail system spanning the length of the airframe. By being attached to the rail system, the modules may be allowed to easily move and shift along the rail system. Such a setup may allow for a multi-objective and/or multi-mission based aircraft system to be rapidly assembled and/or dissembled, providing for an ability to modify various aspects of the aircraft such as center of gravity (COG), either pre-flight or in-flight, through the use of movable modules.

Figure 5A:
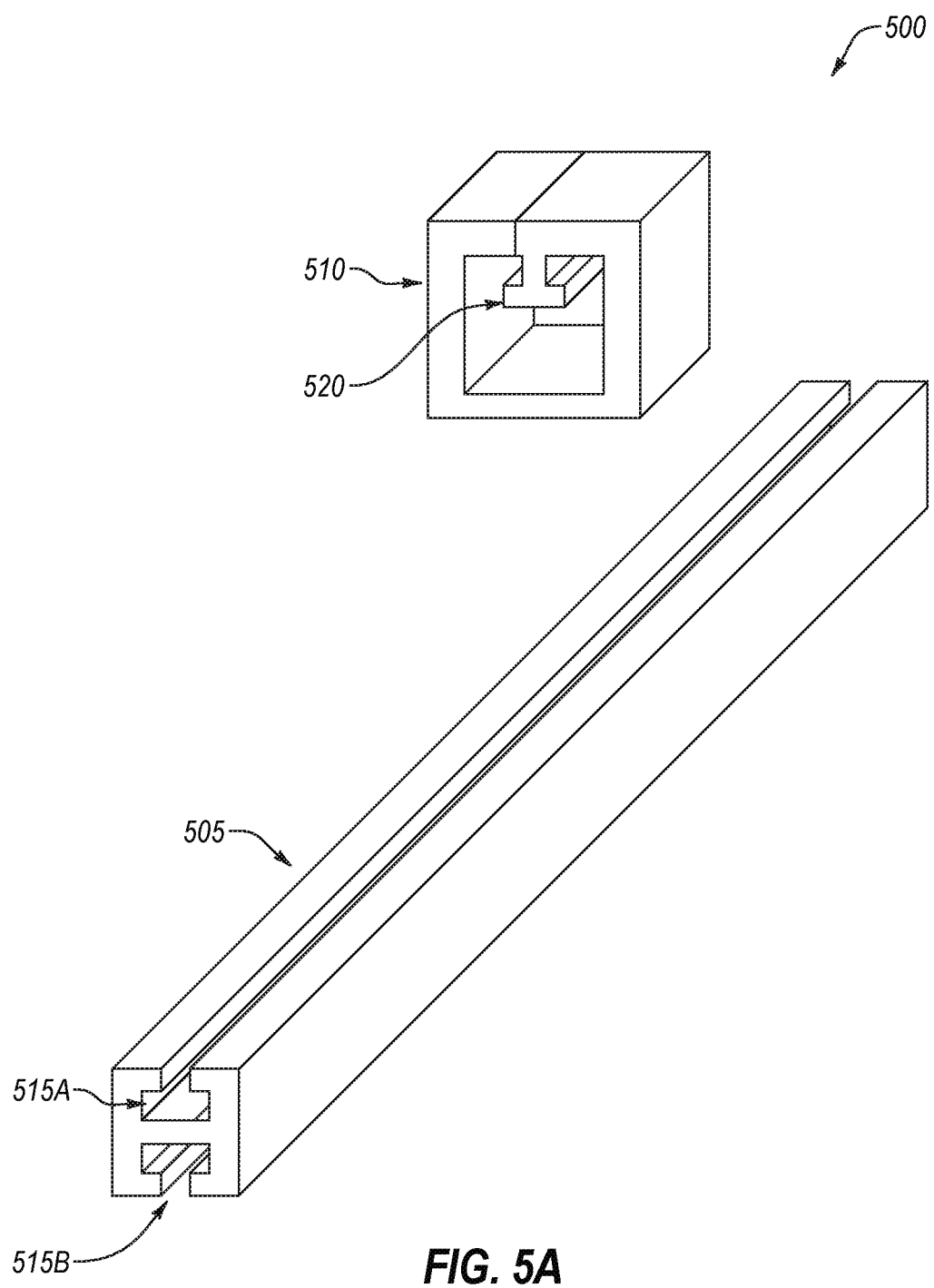
FIG. 5A illustrates an example rail system.

FIG. 5A illustrates an example rail system 500. In accordance with the present disclosure, a rail system 500 may take on any of a variety of forms, including for example, a standardized single or multi channeled linear rail. In some embodiments, the rail system 500 may be composed of carbon fiber, aluminum, stainless steel, or any other type of material along which the modules can slide and can be rigidly fixed into a target position. In some embodiments, the rail system 500 may include a non-channeled beam to which the modules can be attached and/or clamped. Additionally or alternatively, some embodiments may include multiple rails.

In some cases, unmanned aerial vehicles (UAVs), particularly the fixed wing type, have static airframes. These types of airframes, once constructed, often cannot be modified at all. For example, the power system typically cannot be moved from the front of the airframe to the back without substantial redesign of the entire airframe and disassembly of the majority of the airframe. As another example, the wings typically cannot be easily swapped for a different type (e.g., from straight to swept or delta, depending on the mission goals). As an additional example, the airframe cannot typically be changed from a tractor to a pusher type of aircraft. Additionally, new functionality or modifications typically cannot be added without substantial modifications and redesigns of the entire airframe.

In some embodiments, a rail-based modular aircraft system (RBMAS) may address one or more of these design issues, among other things, for example, by providing for a multi-mission/objective airframe that may be rapidly modifiable and adjustable for a mission at hand. However, an RBMAS in accordance with the present disclosure need not address these issues.

Figure 5B:
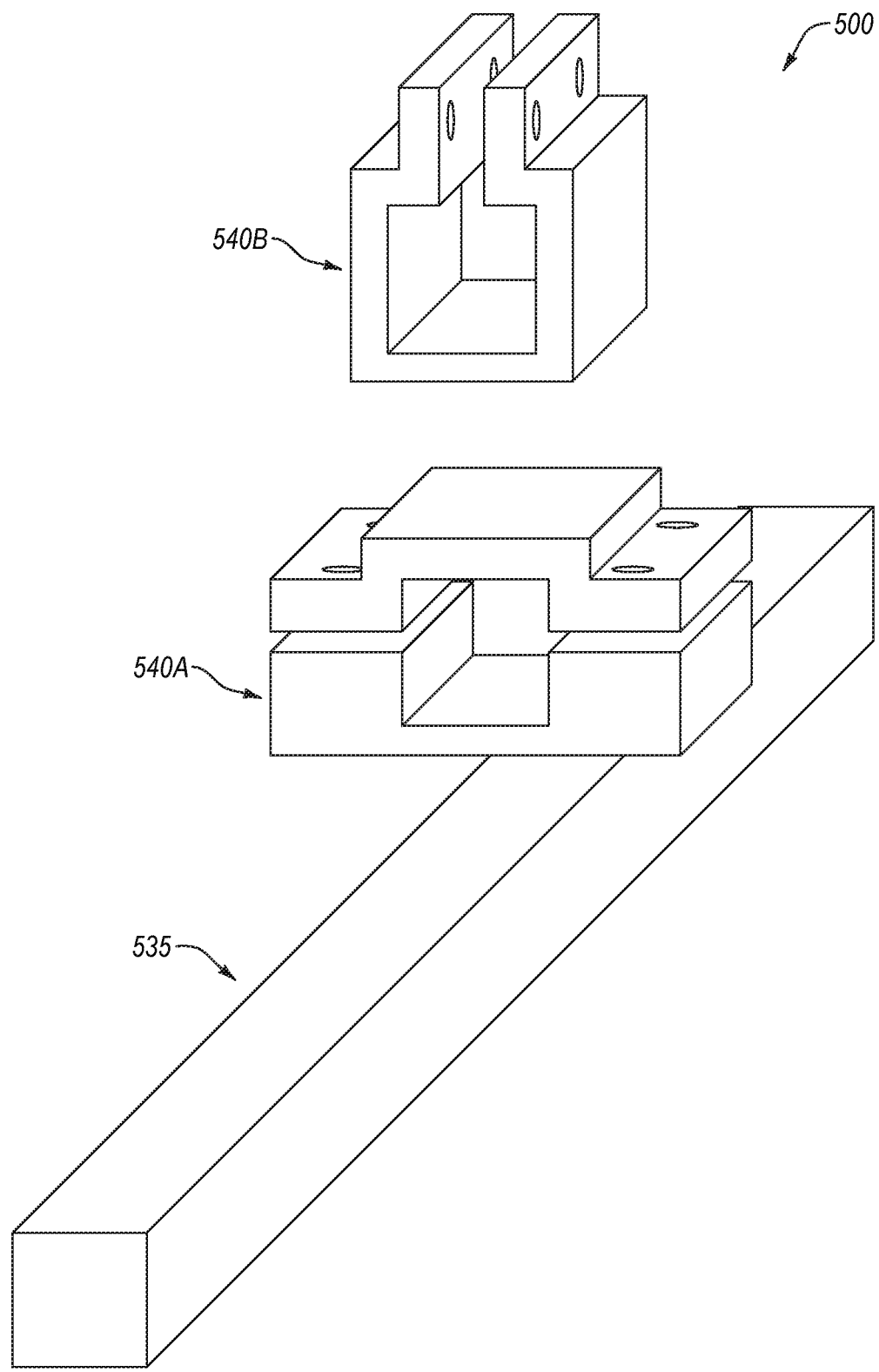
FIG. 5B illustrates another example rail system.
Figure 5C:
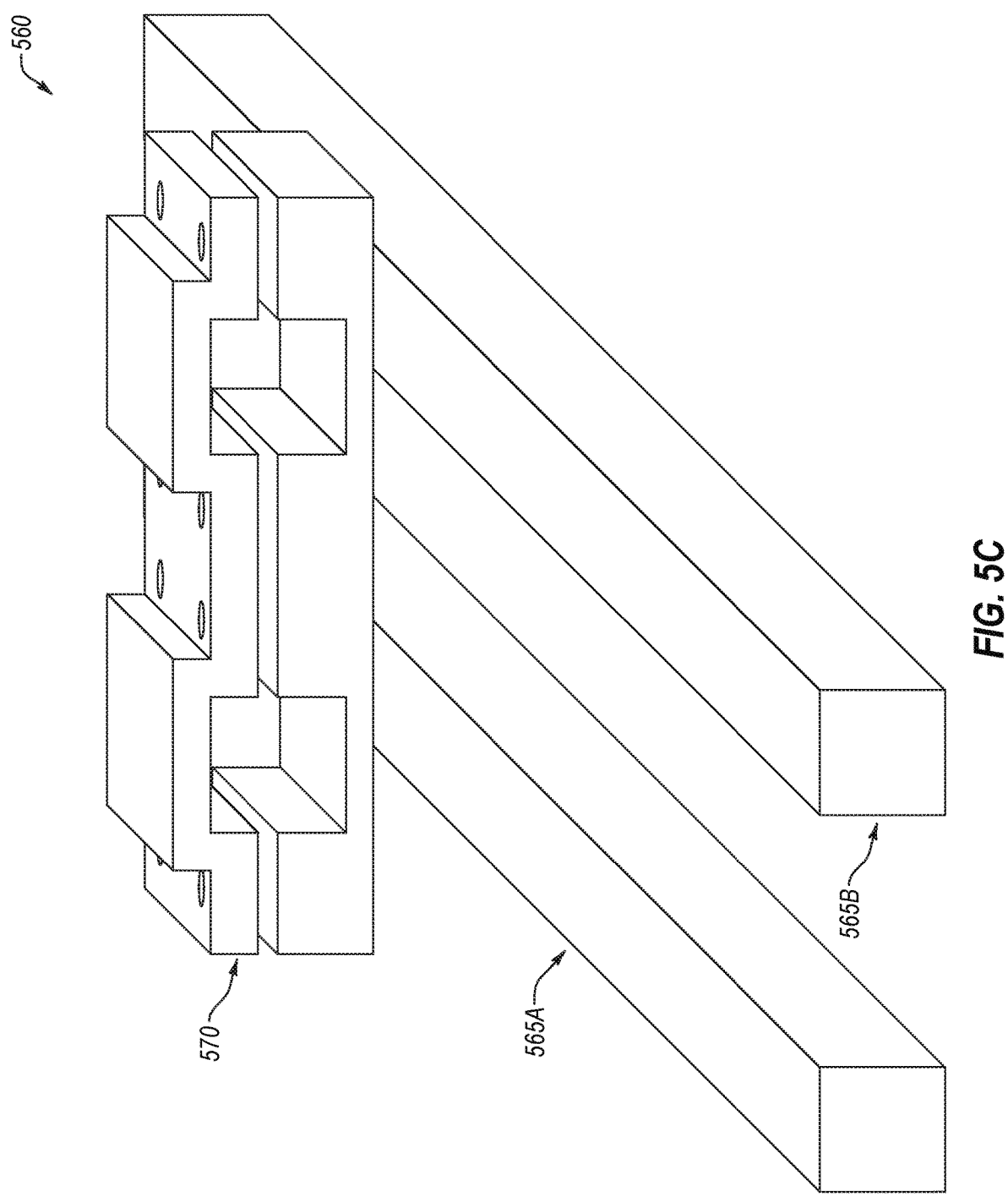
FIG. 5C illustrates another example rail system.

In some embodiments, an RBMAS may include a rail system, a sample of variations of which are illustrated in FIGS. 5A-5C. The rail system may include a rigid centerline system allowing for rapid attachment, detachment, and movement of the modules, which in conjunction with the rail system, may compose the airframe and the aircraft system.

In some embodiments, the rail system may include a rigid rail structure that may be made out of light, yet stiff material, on which aerial vehicle modules can be mounted. Using the rail system, the modules may have the freedom to slide back and forth, and be fixed in position when appropriate. One example of such a system may include a carbon fiber rail, spanning the length of an airframe, with the modules designed in such a way that they can be attached to the rail. A rail 505, such as a carbon fiber rail, in FIG. 5A, may include a channel 515A running on top and a channel 515B running on bottom, with the channels 515 acting as the structure on which the modules slide on the rail, and where they can be tightened such that their position on the rail becomes fixed using an attachment structure 510. The rail 505 may include a constant cross-sectional shape from a first end of the rail 505 to a second end of the rail 505. The attachment structure 510 may include one or more protrusions 520 which may be sized and/or shaped to match the channels 515. For example, in some embodiments, the protrusion 520 may match one of the channels 515, such as the channel 515A and not the channel 515B. This may facilitate proper directional alignment of the attachment structure 510 on the rail 505. Alternatively or additionally, in some embodiments, the protrusion 520 may match both of the channels 515. The rail system 500 may be combined with one or more modules to form an RBMAS.

In FIG. 5B, another example rail system may be illustrated. For example, the rail system 530 may include a single rail 535, such as a carbon fiber rod, without channels. Illustrated next to the rail 535 are a first example attachment structure 540A and a second example attachment structure 540B which may enable a module to travel along the rail 530 and to which modules may be coupled.

In FIG. 5C, another example rail system is illustrated. For example, the rail system 560 may include a multi-rail rail system. Using multiple rails 565A and 565B may add further structural rigidity with a stabilization effect due to a widened plan-form. Additionally or alternatively, modules may be coupled to either rail 565A or rail 565B to provide greater flexibility. While two rails 565 are illustrated, any number of rails 565 in any configuration may be used, such as two rails 565 in a vertical orientation with respect to each other, or three or more rails 565, are within the scope of the present disclosure. Modules may be attached to the rails 565A and 565B using the attachment structure 570. Alternatively or additionally, modules may be attached to one of the rails 565A or 565B using an attachment structure such as the attachment structures 540A and/or 540B of FIG. 5B. In some embodiments, the rails 565A and/or 565B may additionally include channels, such as the channels 515A and/or 515B of FIG. 5A.

In some embodiments, the rail system may be scalable to various sizes. For example, by scaling the size of the rail system and the attachment structures for the modules, an airframe from a size of one meter may be readily scaled to tens of meters. Such a system may also provide a light weight and aerodynamic system as there is no need to accommodate unused space within the airframe, and only used electronics and modules may be attached while other components and modules may be removed if they are not needed or desired for a particular flight.

Figure 6A:
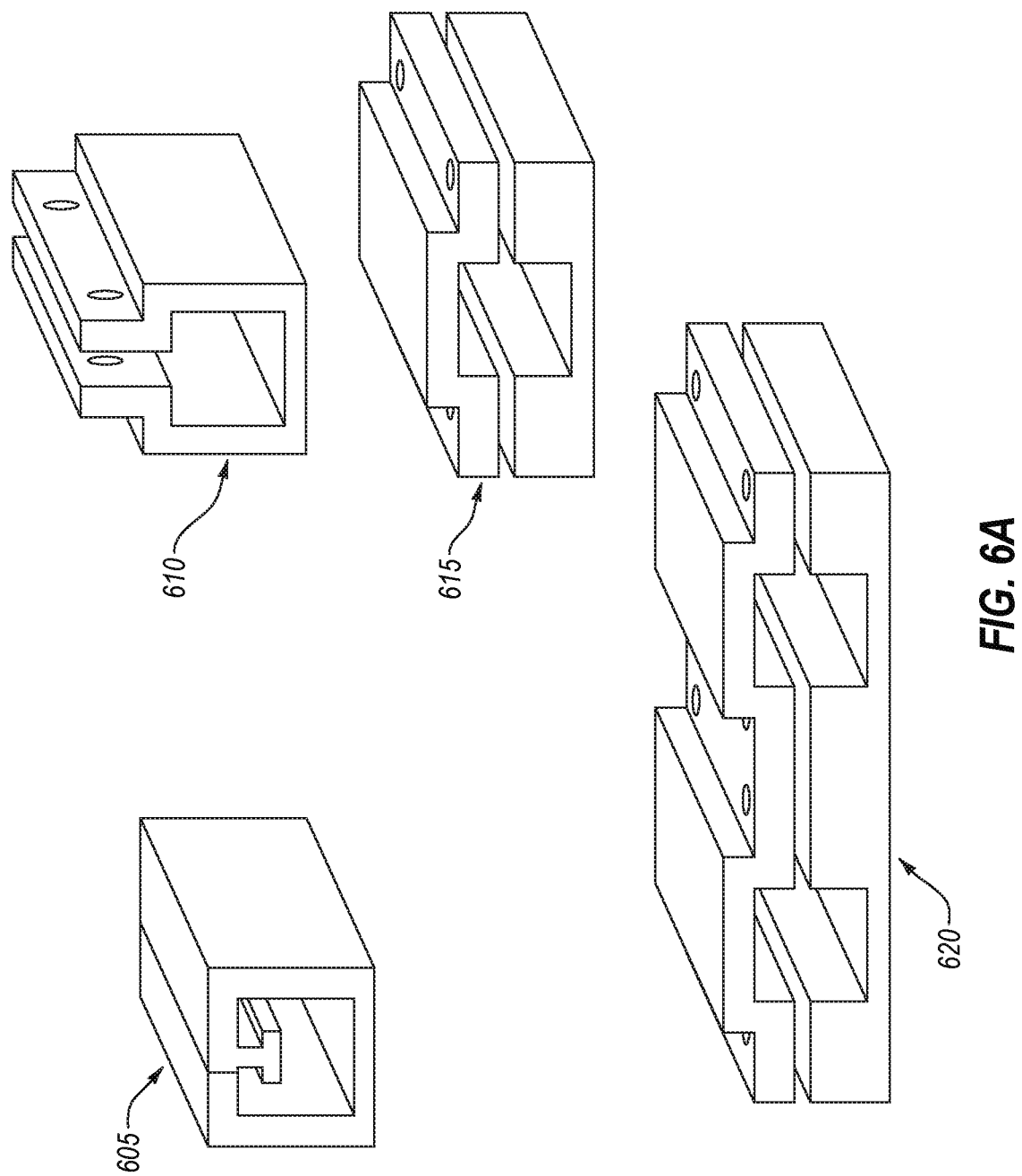
FIG. 6A illustrates examples of rail system attachment structures.

FIG. 6A illustrates four examples of types of different rail system attachment structures. For example, illustrated are a channel attachment structure 605, a non-channel clamp based attachment structure 610, a channel-less attachment structure 615, and a dual-rail based attachment structure 620. Any type of modular, rail airframe system is contemplated in the present disclosure.

Figure 6B:
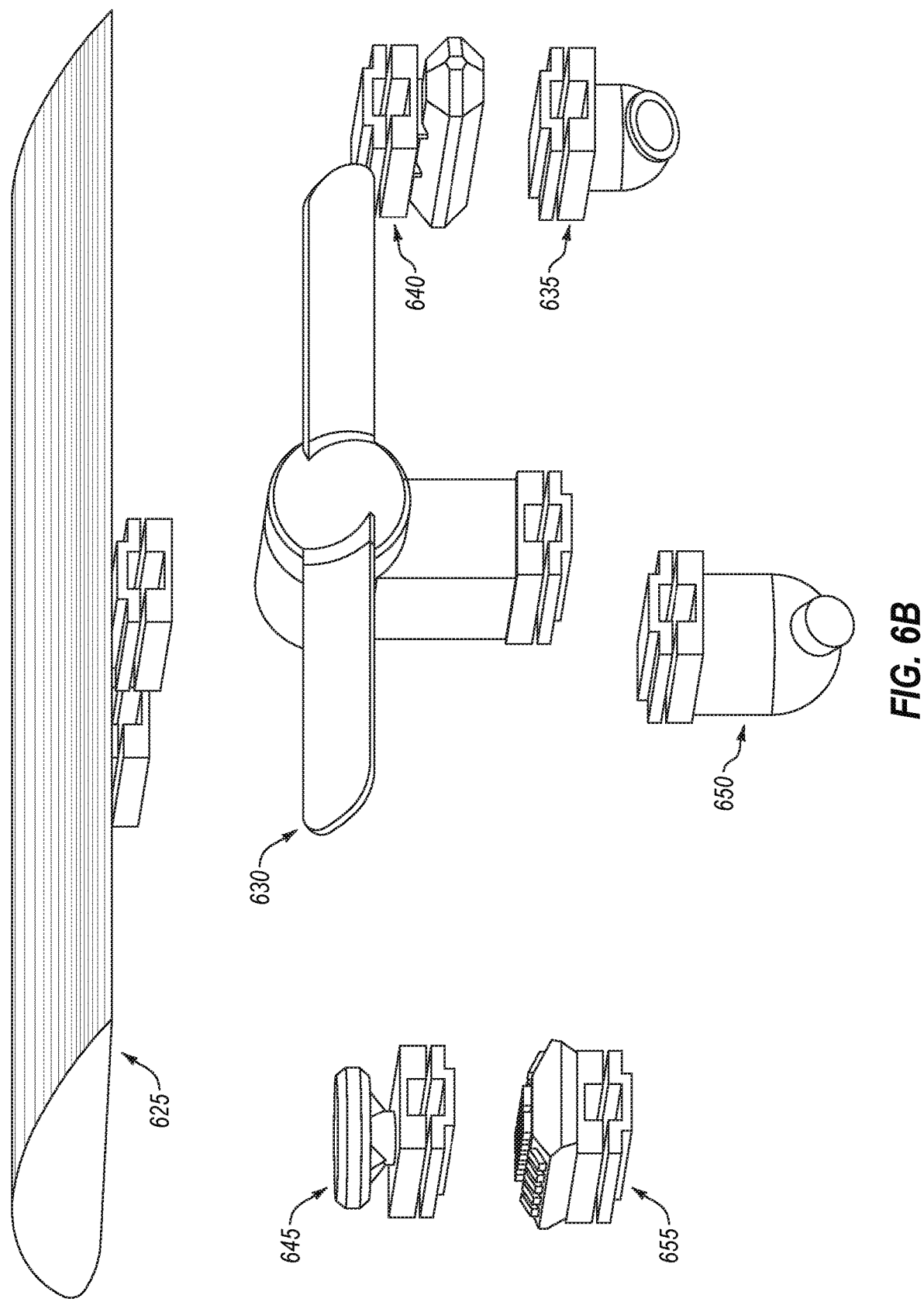
FIG. 6B illustrates examples of modular aircraft system modules.

FIG. 6B illustrates a number of module examples. For example, the modules may include a propulsion module 625, a wing module 630, a camera module 635, a cargo module 640, a sensor module 645, a flare module 650, and a signal gathering and radar module 655, etc. These modules can be attached in any configuration, and moved on the rail system until a desired configuration is reached. For example, the modules may be placed in a desired order and moved around until an optimal configuration and balance (such as the center of gravity) is achieved. In some embodiments, each module may be configured to be individually movable along a rail such as the rails 505, 535, and 565 of FIGS. 5A, 5B, and 5C, respectively. Similarly, each module may be configured to be individually fixable at a fixed point along the rail.

The propulsion module 625 may be configured to provide forward motion to the system to which the propulsion module 625 is attached. For example, if the propulsion module 625 is attached to an aircraft, the propulsion module 625 may provide forward motion to the aircraft. In some embodiments, the propulsion module 625 may include a propeller. The wing module 630 may be configured to provide lift to the aircraft as the aircraft moves forward. The camera module 635 may be configured to capture images. The cargo module 640 may be configured to store a payload of an aircraft system. The sensor module 645 may be configured to obtain measurements of different properties around an aircraft, such as pressure, temperature, humidity, wind speed, altitude, etc. The flare module 650 may be configured to deploy a visual flare. The signal gathering and radar module 655 may be configured to emit energy waves and measure returning waves.

In some embodiments, a motorized component may be coupled to the rail system and/or to various modules. For example, the rail system may include gears and one or more of the modules, such as one or more of the modules 625, 630, 635, 640, 645, 650, and 655, may include a motor to move the particular module along the geared rail. In such an embodiment, the modules may be moved along the rail system during a flight. For example, the cargo module 640 may be carrying a package or some payload and the payload may be delivered to a desired destination. Upon release of the payload, the cargo module 640 and/or other modules may adjust their position along the rail to adjust the center of gravity of the aircraft.

In some embodiments, additional modules may also be used. For example, a tail module (such as that illustrated in FIG. 7A) may be configured to provide stability to an aircraft system. A control module may be configured to control operation of an aircraft system. For example, in some embodiments, the control module may control the operation of motorized components associated with the modules, as discussed above. Additionally or alternatively, in some embodiments, the control module may be configured to control the operation of other modules, such as the operation of the camera module 635, the propulsion module 630, or other modules. A global positioning system (GPS) module may be configured to identify a position of an aircraft system based on receiving signals from satellites.

Figure 7A:
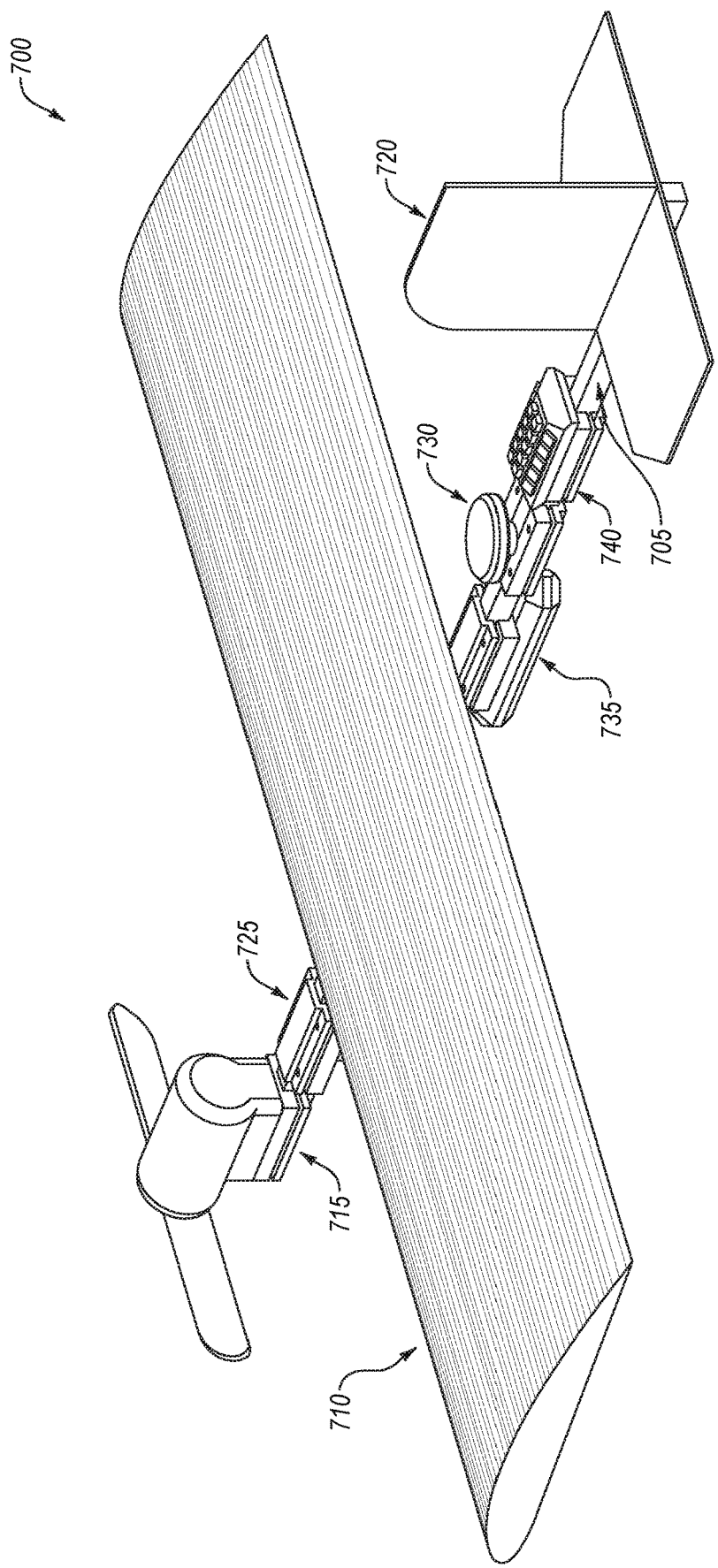
FIG. 7A illustrates an example rail-based modular aircraft system.
Figure 7B:
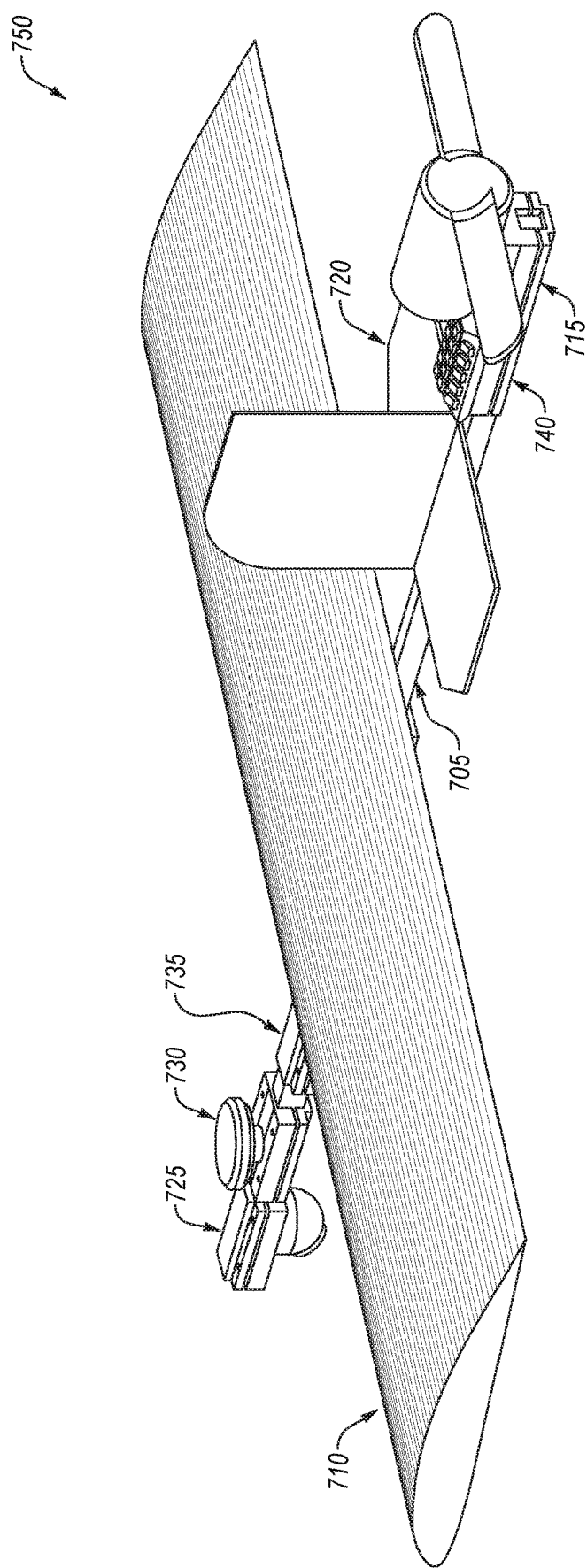
FIG. 7B illustrates another example rail-based modular aircraft system.

FIGS. 7A and 7B illustrate two examples of a RBMAS using the same rail 705 and the same modules 710, 715, 720, 725, 750, 735, and 740, rearranged in a different manner. For example, the aircraft 700 of FIG. 7A illustrates a tractor configuration, with majority of the payload carried under the wing. For example, the propulsion module 715 is positioned at the front end of the rail 705. The camera module 725 may be positioned behind the propulsion module 715 on the rail 705. The wing module 710 may be positioned behind the camera module 725 on the rail 705. The cargo module 735 may be positioned behind the wing module 710 and at least partially under the wing module 710 on the rail 705. The sensor module 730 may be positioned behind the cargo module 735 on the rail 705. The signal gathering and radar module 740 may be positioned behind the sensor module 730 on the rail 705. The tail module 720 may be positioned at the rear end of the rail 705.

In contrast, the aircraft 750 of FIG. 7B illustrates a pusher configuration, opening up the front for a frontal oriented camera and sensor module, and payload further moved to be in front of the wing. For example, the camera module 725 may be positioned at the front end of the rail 705. The sensor module 730 may be positioned behind the camera module 725 on the rail 705. The cargo module 735 may be positioned behind the sensor module 730 and in front of the wing module 710. The wing module 710 may be positioned behind the cargo module 735 on the rail 705. The tail module 720 may be positioned behind the wing module 710 on the rail 705. The signal gathering and radar module 740 may be positioned behind the tail module 720 on the rail 705. The propulsion module 715 may be positioned at the rear end of the rail 705. The examples of FIGS. 7A and 7B are not meant to necessarily illustrate a working example of an aircraft, but rather to illustrate the modular nature of the RBMAS and the ability to reconfigure an aircraft in a modular manner. In some embodiments, the aircraft 700 and/or the aircraft 750 could include modules in a different order, different modules, additional modules, or fewer modules, as desired.

Figure 7C:
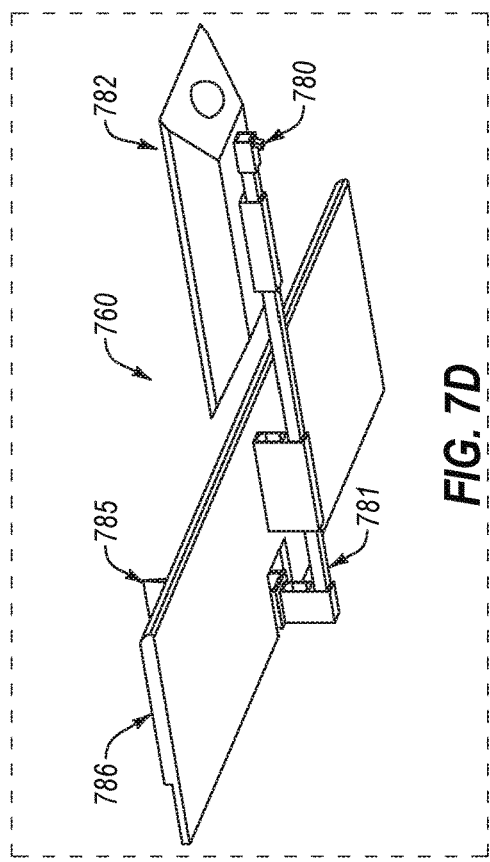
FIG. 7C illustrates a rail and a group of modules for example rail-based modular aircraft systems.
Figure 7D:
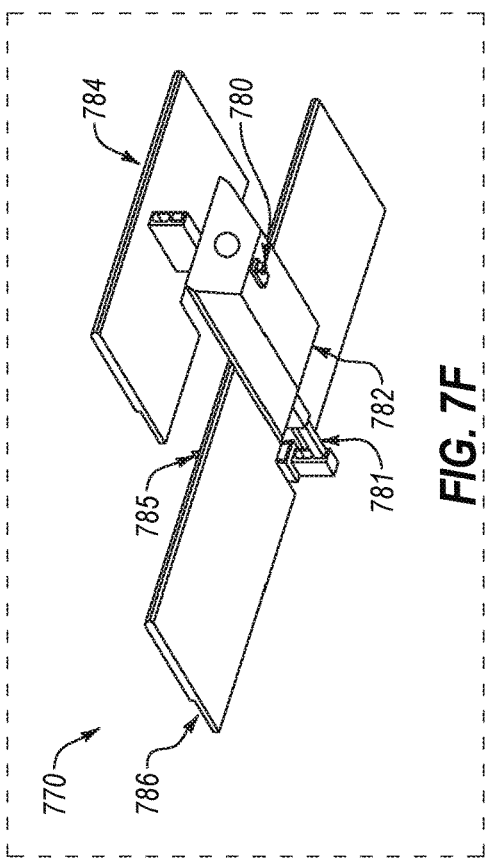
FIG. 7D illustrates a first example rail-based modular aircraft system using the rail and the group of modules.
Figure 7E:
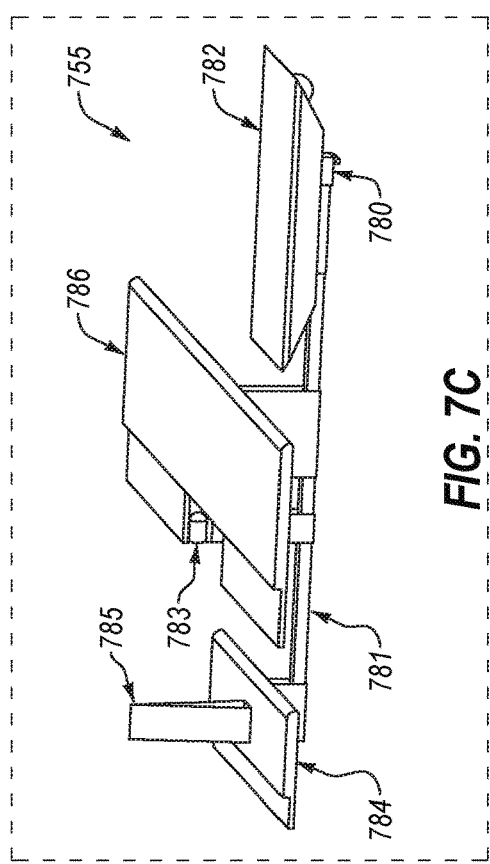
FIG. 7E illustrates a second example rail-based modular aircraft system using the rail and the group of modules
Figure 7F:
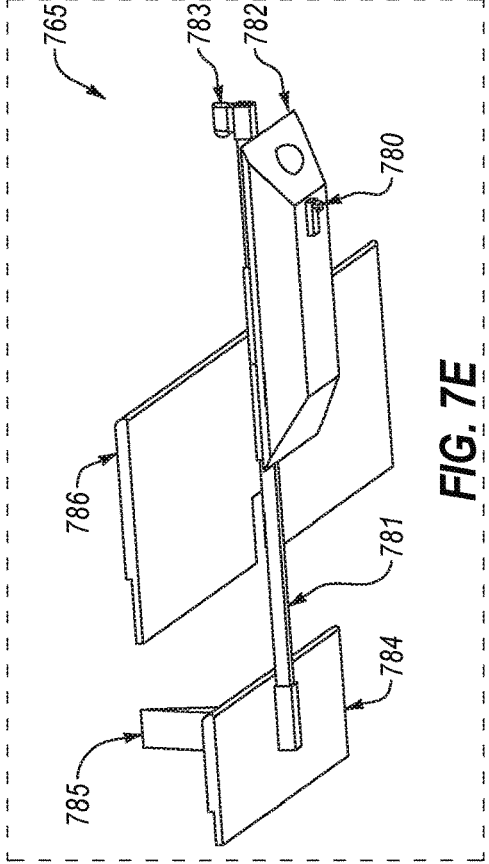
FIG. 7F illustrates a third example rail-based modular aircraft system using the rail and the group of modules

FIGS. 7C-7F illustrate four additional examples of rail-based modular aircraft systems. For example, FIG. 7C illustrates a conventional, pusher RBMAS 755; FIG. 7D illustrates a flying wing, pusher RBMAS 760; FIG. 7E illustrates a conventional, tractor RBMAS 765; FIG. 7F illustrates a canard, pusher RBMAS 770; and FIG. 7G illustrates an exploded view of the various components utilized in the RBMASs 755, 760, 765, and 770. Each of the RBMAS 755, 760, 765, and 770 may include a rail 781, a bungee hook 780, and a set of modules 782-786. The rail 781 may include a carbon fiber rail. The bungee hook 780 may be configured to interface with a launcher, such as the launcher discussed below with reference to FIGS. 9A-9C. The modules 782-786 may include a camera/power module 782 configured to capture images and to provide power to other modules, a propulsion module 783 configured to provide forward motion for the RBMAS, a short wing module 784 configured to control a direction of travel of the RBMAS, a vertical stabilizer module 785 configured to provide directional alignment of the RBMAS, and a long wing module 786 configured to provide lift to the RBMAS. Additionally or alternatively, the RBMAS 755, 760, 765, and 770 may include additional modules. Each of the RBMAS 755, 760, 765, and 770 may include the same modules but in a different configuration (some modules may not be visible on each RBMAS). For example, a pusher RBMAS, such as the conventional, pusher RBMAS 755 of FIG. 7C; the flying wing, pusher RBMAS 760 of FIG. 7D; and the canard, pusher RBMAS 770 of FIG. 7F, may include the propulsion module 783 positioned towards the middle or rear of the respective rail 781 of the RBMAS. In contrast, a tractor RBMAS, such as the conventional, tractor RBMAS 765 of FIG. 7E, may include the propulsion module 783 positioned towards the front of the RBMAS. In some embodiments, an RBMAS may be rapidly reconfigured between one configuration, such as the conventional, pusher RBMAS 755, to another configuration, such as the canard, pusher RBMAS 770.

Figure 8A:
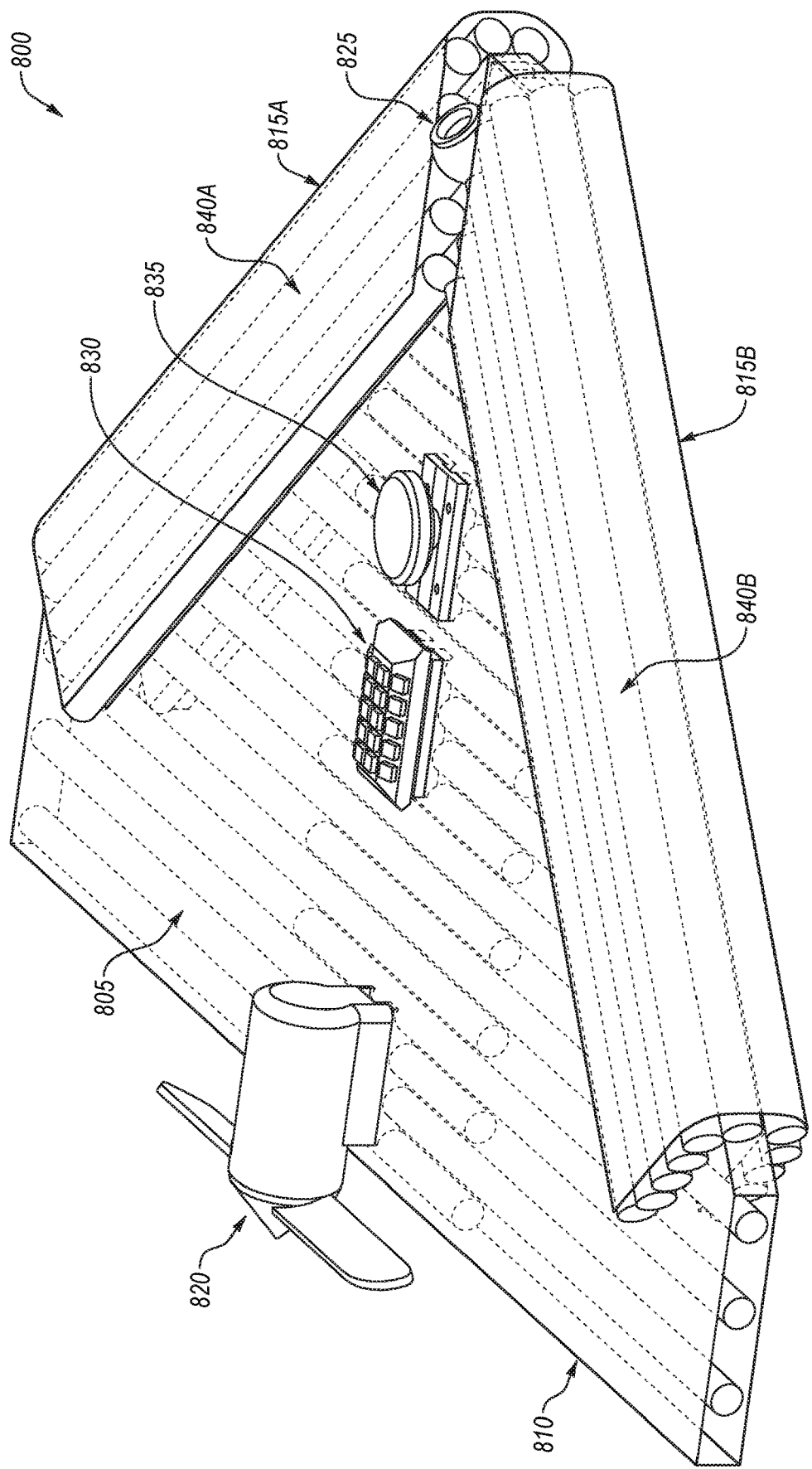
FIG. 8A illustrates an example of a modular aircraft system using a wing member.

FIG. 8A illustrates another example of a modular aircraft system 800. For example, the aircraft 800 of FIG. 8A may include one or more modules coupled to the aircraft. As illustrated in FIG. 8A, the aircraft may include any number of modules that may be bolted, screwed, or riveted to a triangular wing member 805. In some embodiments, the triangular wing member 805 may be similar to the wing 300 of FIG. 3. For example, the wing member 805 may include a base edge 810, a first leading edge 815A, and a second leading edge 815B. The first leading edge 815A may taper inwards as the first leading edge 815A extends away from the base edge 810. The second leading edge 815B may be positioned opposite the first leading edge 815A and may taper inwards as the second leading edge 815B extends away from the base edge 810. For example, the aircraft 800 may include a propulsion module 820, a signal gathering and radar module 830, a camera module 825, a sensor module 835, and other modules. In these and other embodiments, the modules may be removably coupled to the triangular wing member 805. For example, the camera module 825 may be positioned proximate a vertex of the leading edges 815. In these and other embodiments, the modules may be removed and reconfigured in order to adjust the center of gravity or the functionality of the aircraft 800. In some embodiments, one or more of the modules may be removably coupled to a first surface of the wing member 805 and/or a second surface of the wing member 805. Although the modules 820, 825, 830, and 835 are depicted as being attached in the middle of the base edge 810, one or more modules may be attached to the wing member 805 in other areas. For example, modules may be placed in other areas of the wing member 805 to create a desired center of gravity for the aircraft 800.

In some embodiments, a second sheet 840A of holding material with multiple strengthening material components may be attached to the wing member 805 and may cover the first leading edge 815A of the wing member 805 such that the second sheet 840A is attached to a first surface and a second surface of the wing member 805. Similarly, a third sheet 840B of holding material with multiple strengthening material components may be attached to the wing member 805 and may cover the second leading edge 815B of the wing member such that the third sheet 840B is attached to the first surface and the second surface of the wing member 805.

Figure 8B:
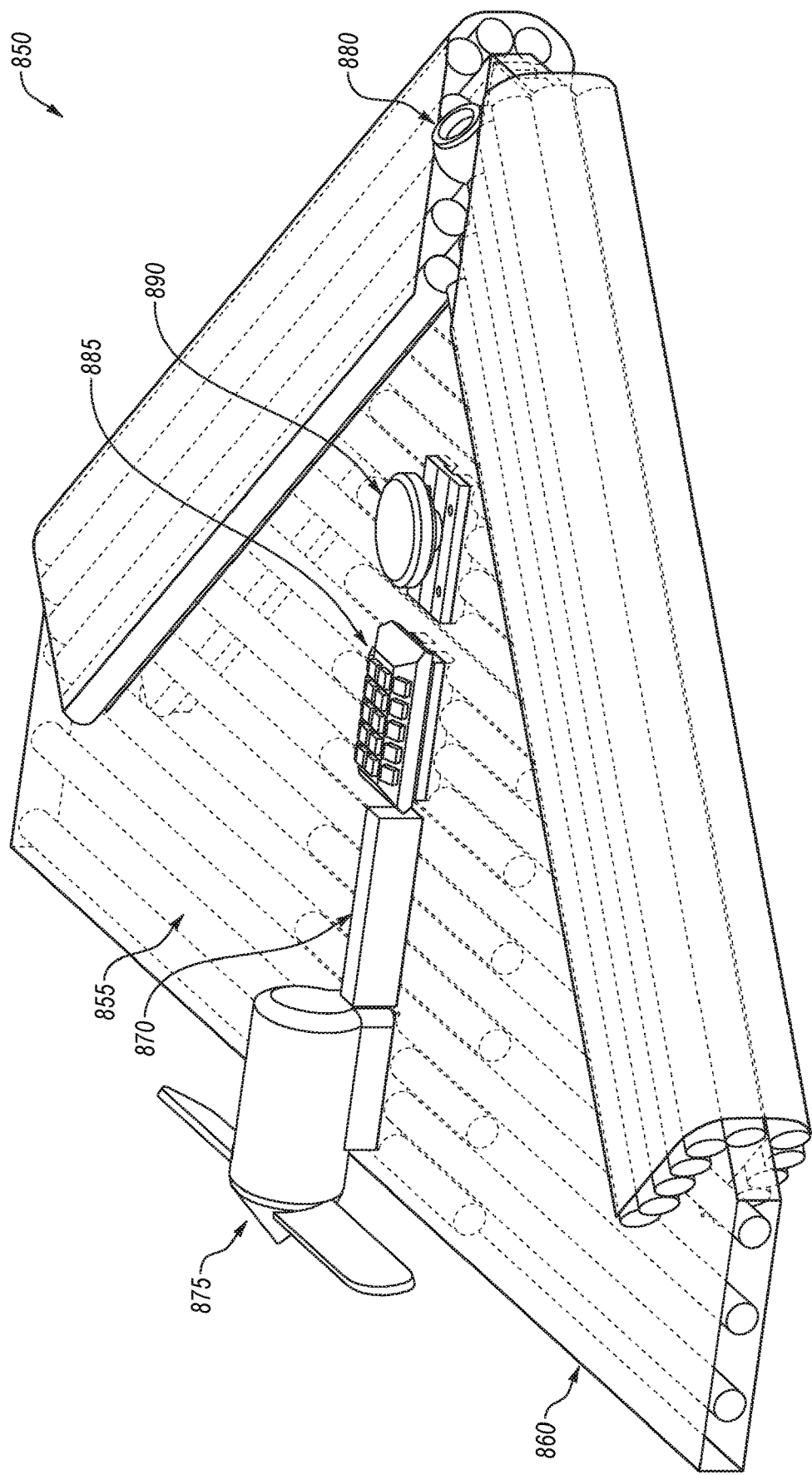
FIG. 8B illustrates another example of a modular aircraft system using a wing member.

FIG. 8B illustrates a second example aircraft 850 similar to the aircraft 800 of FIG. 8A. The aircraft 850 of FIG. 8B may additionally include a rail 870 attached to the wing member 855. The rail 870 may be similar to the rails 505, 535, and 565 of FIGS. 5A, 5B, and 5C, respectively. The modules 875, 880, 885, and 890 may be similar to the modules 820, 825, 830, and 835 of FIG. 8A, respectively. The modules 875, 880, 885, and 890 may be removably attached to rail 870. For example, each of the modules 875, 880, 885, and 890 may be configured to be movable along at least a portion of the rail 870 and may be configured to be fixable at a fixed point along the rail 870. In some embodiments, the rail 870 may be positioned approximately in the middle of the wing member 855. The rail 870 may extend from a base edge 860 substantially perpendicular to the base edge. In some embodiments, the rail 870 may extend the entire length of the aircraft 850, such as from the base edge 860 to the apex of the aircraft 850.

Figure 9A:
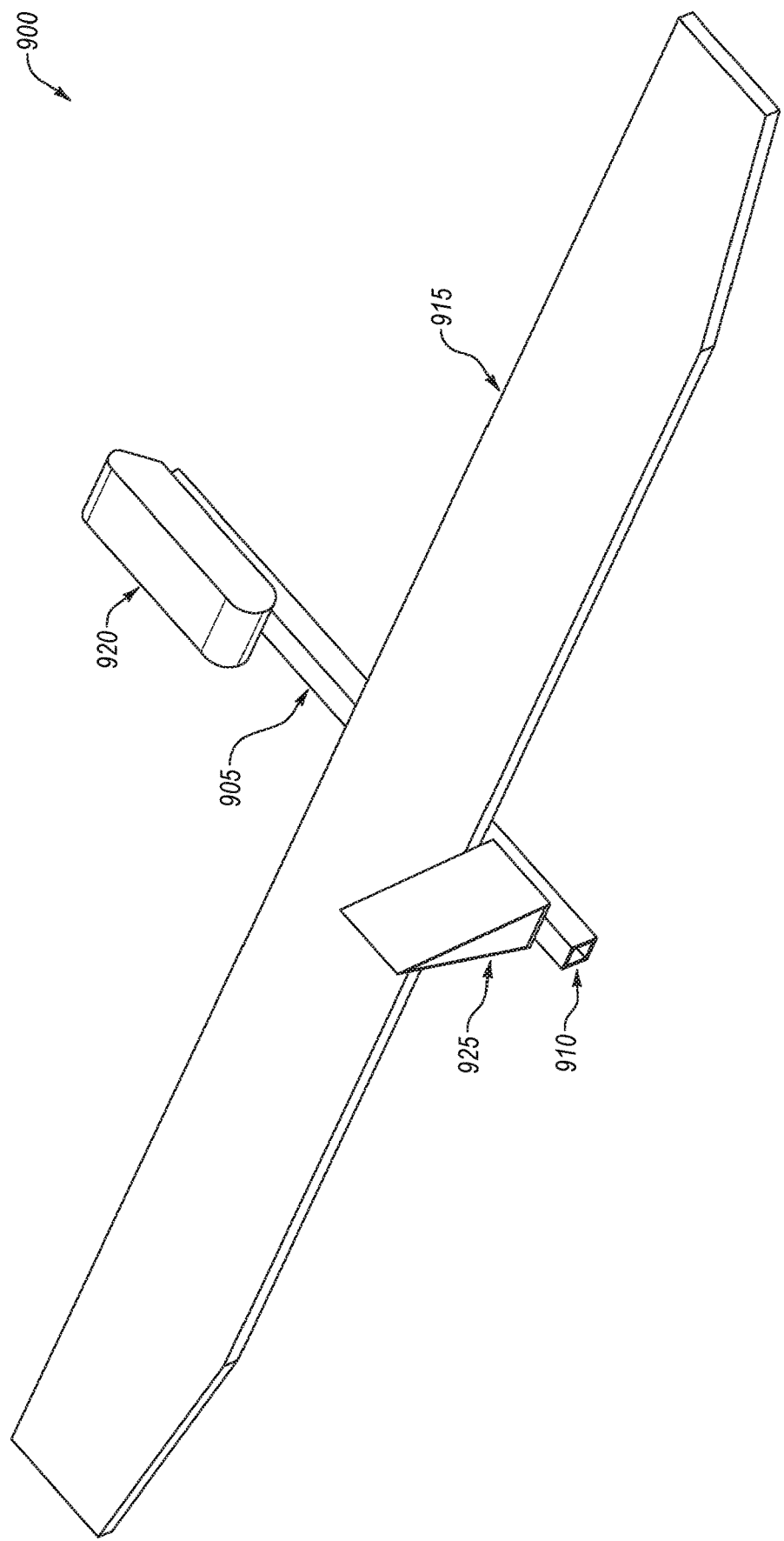
FIG. 9A illustrates an example rail-based modular aircraft system configured to interact with a launcher.

FIG. 9A illustrates an example rail-based modular aircraft system 900 configured to interact with a launcher. The RBMAS 900 may include a rail 905 including an open end 910, a wing module 915, a propulsion module 920, and a tail module 925. The various modules may be similar or comparable in form and/or function to those described above. The rail 905 may be hollow with a closed end opposite the open end 910. In some embodiments, the hollow rail 905 with the open end 910 and the closed end may be used in conjunction with a pneumatic or spring based catapult or with other rapid deployment systems to allow rapid deployment of the RBMAS 900 into flight.

Figure 9B:
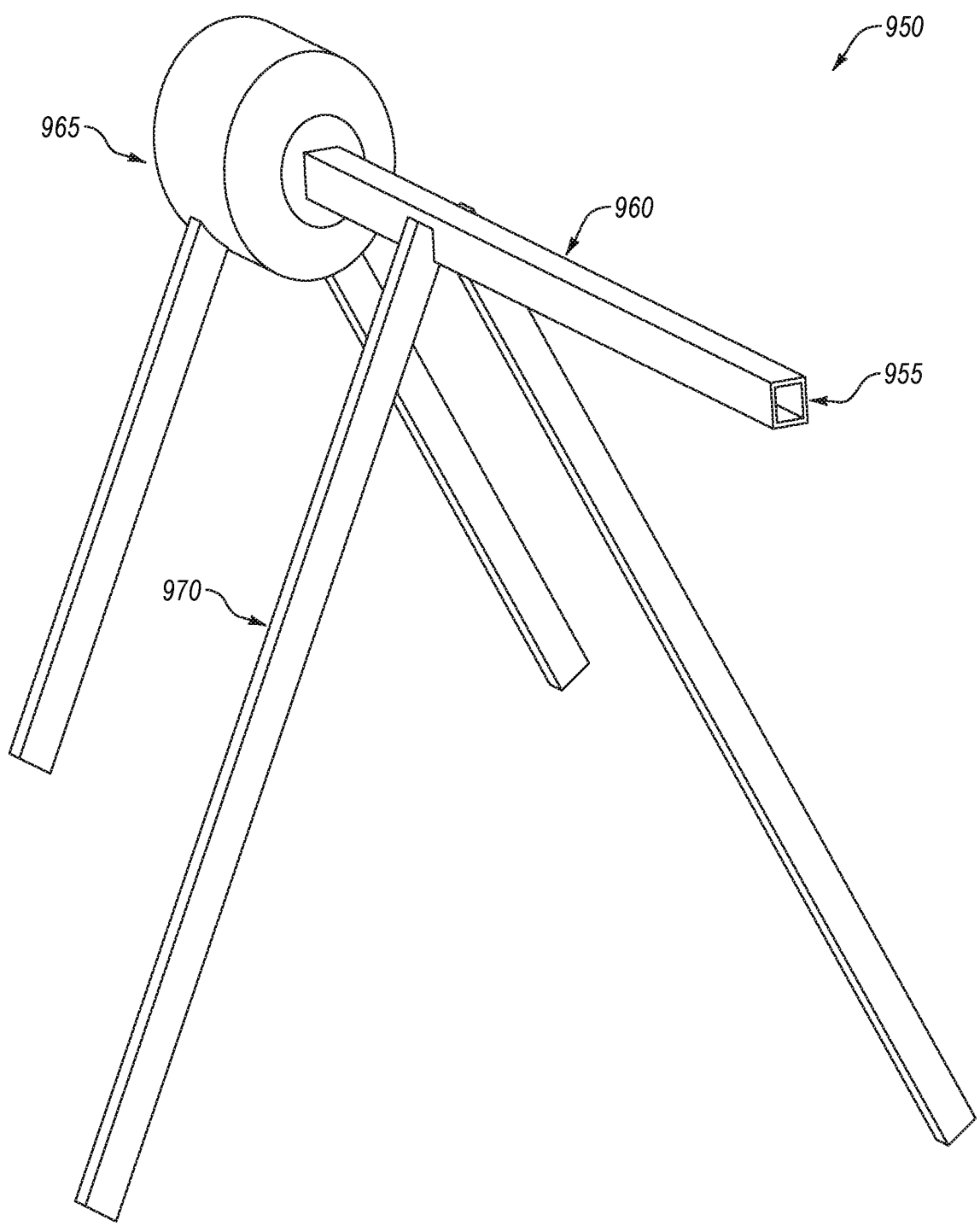
FIG. 9B illustrates an example launcher.

FIG. 9B illustrates an example launcher 950. The launcher 950 may include multiple legs 970, a nozzle 960 with an open end 955, and a pneumatic driver 965. The pneumatic driver may be a pump or compressor which may push air out through the open end 955 of the nozzle 960. The legs 970 may be adjustable to position the nozzle 960 and the open end 955 in an intended takeoff or flight direction of an RBMAS launched from the launcher 950.

Figure 9C:
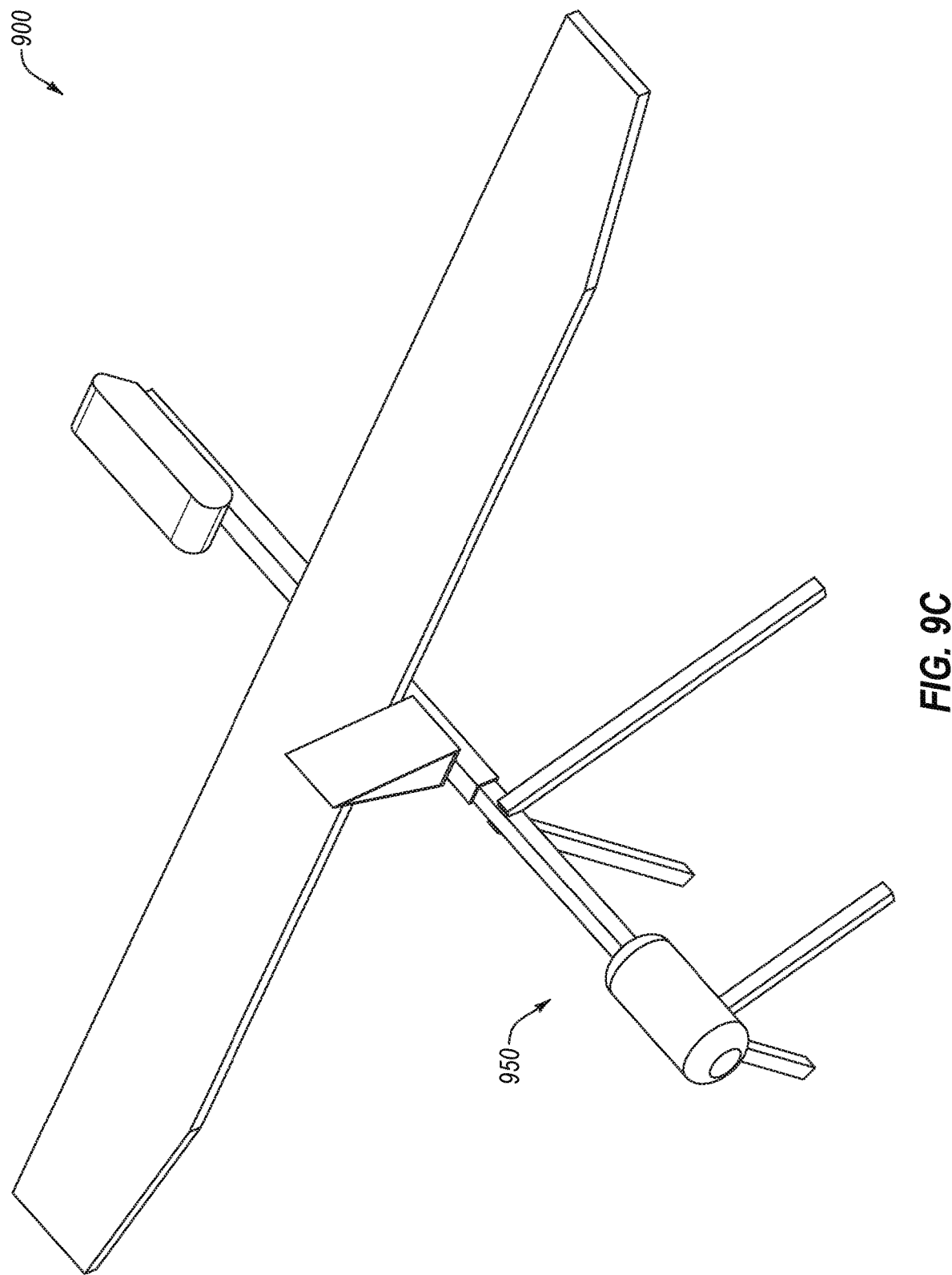
FIG. 9C illustrates a rail-based modular aircraft system together with a launcher.

FIG. 9C illustrates the rail-based modular aircraft system 900 together with the launcher 950. The nozzle 960 of FIG. 9B may be configured to be inserted into the open end 910 of the rail 905 of the RMBAS 900 of FIG. 9A. When the pneumatic driver 965 is activated, air pressure may build up inside the nozzle 960 and the hollow rail 905 of the RBMAS 900 positioned on the nozzle 960. After sufficient air pressure builds up in the nozzle 960 and the rail 905, the RBMAS 900 may be launched from the launcher 950 into flight. While FIGS. 9B and 9C illustrate a pneumatic launcher 950, other launchers, such as a spring launcher, may also be configured to allow rapid launching ability of the RBMAS 900. For example, a spring launcher may include a spring, which may be compressed to result in launching the RBMAS 900 when the spring is allowed to relax.

In some embodiments, an aircraft in accordance with the present disclosure may provide one or more advantages. For example, such a modular aircraft system may provide for rapid assembly. Due to the system being based on modules and a modifiable rail based module attachment system, such an aircraft system may be easy to produce and specialize. For example, it is possible to stack a power module, wing module, and control module in flyable order, fix the positions of the modules based on a desired center of gravity, and have the system be ready for flight. Alternatively, the same system may then be modified, even with the same modules, for a particular mission (such as fast flight, endurance based flight, maneuverability, stability, etc.).

An example of another potential advantage may include an aircraft suitable for multiple missions. For example, different missions may require different types of airframe configurations, either for long range, or for speed. One or more embodiments of the present disclosure may allow the mission planner to rapidly change out the modules (for example, changing wings, changing wing type, changing to a canard wing configuration, changing to a tractor/pusher configuration, adding/removing mount points, etc.). By changing out the modules, the mission planner may create an airframe that is specifically optimized for the mission with a single modular aircraft system.

An additional example of a potential advantage may include the extendibility of the modular aircraft system. For example, as new modules are made, they can be attached as needed to extend existing modular aircraft systems, allowing existing modular aircraft systems to take advantage of new technology as it becomes available, and new innovations as they emerge. Because of the extendibility, one or more embodiments of the present disclosure may allow for longevity of modular aircraft systems.

Another example of a potential advantage of the present disclosure may include the ease of maintenance/repair. For example, during maintenance or repair, only the damaged modules need to be replaced or repaired. Due to the ease of removing and adding modules, repairs and maintenance of modular aircraft systems may be very easy and rapid, for example, by simply removing and/or replacing the damaged modules. Additionally, a modular aircraft system may still be operational after the removal of a defective component. Such a feature may also make the system cost effective, since damage to a single part will not result in costly repairs or replacement of an entire aircraft, but only require replacement or repair of the damaged module.

Another example of a potential advantage of the present disclosure may include mission task optimization. For example, by keeping a set of modules for numerous types of missions, when a particular mission arises, an aircraft may be rapidly "modulated" specifically for that mission.

In some embodiments, a modular aircraft system and/or one or more modules of a modular aircraft system may be constructed using a composite material consistent with the present disclosure. For example, a wing module may include a wing constructed using the Sher Composite Wrap.

The subject matter claimed in the present disclosure is not limited to embodiments that solve any disadvantages or that operate only in environments such as those described above. Rather, this background is only provided to illustrate one example technology area where some embodiments described may be practiced.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A rail-based modular aircraft system comprising:
   a rail extending from a first end to a second end, the rail including a constant cross-sectional shape from the first end to the second end;
   a wing module configured to interface with the rail such that the wing module is individually movable along at least a portion of the rail and configured to be fixable at a fixed point along the rail; and
   a propulsion module configured to interface with the rail such that the propulsion module is individually movable along at least a portion of the rail and configured to be fixable at a fixed point along the rail, the propulsion module configured to provide forward motion to the modular aircraft system wherein the wing module includes a covering of a composite material including a corrugated holding material with a plurality of corrugations extending along a first axis of the corrugated holding material substantially perpendicular to the rail and a plurality of strengthening material components disposed within the plurality of corrugations such that the composite material is stiff along the first axis and is bendable along a second axis substantially perpendicular to the first axis and substantially parallel to the rail.

2. The rail-based modular aircraft system of claim 1, wherein the rail includes a channel and wherein the wing module and the propulsion module are configured to interface with the channel on the rail to slide on the rail.

3. The rail-based modular aircraft system of claim 1, wherein the wing module includes a covering of a composite material including a corrugated holding material with a plurality of corrugations extending along a first axis of the corrugated holding material substantially perpendicular to the rail and a plurality of strengthening material components disposed within the plurality of corrugations such that the composite material is stiff along the first axis and is bendable along a second axis substantially perpendicular to the first axis and substantially parallel to the rail.

4. The rail-based modular aircraft system of claim 3, wherein the plurality of corrugations are arranged in an interleaved pattern such that two adjacent strengthening material components overlap through a first portion of the corrugated holding material and extend without overlapping through second and third portions of the corrugated holding material.

5. The rail-based modular aircraft system of claim 1, further comprising a camera module configured to interface with the rail such that the camera module is individually movable along at least a portion of the rail and configured to be fixable at a fixed point along the rail, the camera module configured to capture images.

6. The rail-based modular aircraft system of claim 5, further comprising one or more additional modules configured to interface with the rail such that the one or more additional modules are individually movable along at least a portion of the rail and configured to be fixable at a fixed point along the rail, the one or more additional modules including at least one of: a flare module configured to deploy a visual flare, a signal gathering and radar module configured to emit energy waves and measure returning waves, a cargo module configured to store a payload of the aircraft system, a tail module configured to provide stability to the aircraft system, and a control module configured to control operation of the aircraft system.

7. The rail-based modular aircraft system of claim 6, wherein the one or more additional modules include the camera module and the tail module, and wherein the camera module is positioned near the first end of the rail, the propulsion module is positioned near the second end of the rail, the wing module is positioned between the camera module and the propulsion module, and the tail module is positioned between the wing module and the propulsion module.

8. The rail-based modular aircraft system of claim 1 further comprising a second rail parallel to the rail and wherein the wing module and the propulsion module are further configured to interface with the rail and the second rail such that the wing module and propulsion module are individually movable along at least a portion of the rail and the second rail and are configured to be fixable at a fixed point along the rail and the second rail.

* * * * *